(12) United States Patent
McCoskey et al.

(10) Patent No.: US 7,549,607 B2
(45) Date of Patent: Jun. 23, 2009

(54) AIRCRAFT HAVING A DUAL FLOOR SERVICING SYSTEM ASSOCIATED WITH AN OPERATIONAL GROUND SUPPORT SYSTEM

(75) Inventors: William R. McCoskey, Bothell, WA (US); Richard N. Johnson, Anacortes, WA (US)

(73) Assignee: The Boeing Company, Chicago, IL (US)

( * ) Notice: Subject to any disclaimer, the term of this patent is extended or adjusted under 35 U.S.C. 154(b) by 597 days.

(21) Appl. No.: 11/164,463

(22) Filed: Nov. 23, 2005

(65) Prior Publication Data

US 2007/0040066 A1    Feb. 22, 2007

Related U.S. Application Data

(63) Continuation-in-part of application No. 10/711,610, filed on Sep. 28, 2004, now Pat. No. 7,275,715.

(51) Int. Cl.
*B64C 9/00*  (2006.01)
(52) U.S. Cl. .................................. 244/137.1
(58) Field of Classification Search ............. 244/137.1, 244/137.2, 114 R
See application file for complete search history.

(56) References Cited

U.S. PATENT DOCUMENTS

| | | | |
|---|---|---|---|
| 1,867,602 A | 7/1932 | Stukenborg | |
| 3,059,712 A | 10/1962 | Hautau | |
| 3,419,164 A | 12/1968 | O'Neill | |
| 3,556,441 A | 1/1971 | Oberlander | |
| 3,595,407 A | 7/1971 | Muller-Kuhn et al. | |
| 3,730,359 A | 5/1973 | Andersson | |
| 3,762,670 A | 10/1973 | Chillson | |
| 3,874,819 A | 4/1975 | Collins et al. | |
| 3,977,631 A | 8/1976 | Jenny | |
| 4,312,619 A | 1/1982 | Anderson et al. | |
| 4,416,435 A | 11/1983 | Szendrodi et al. | |
| 4,658,874 A | 4/1987 | von Meyerinck | |
| 4,659,039 A | 4/1987 | Valdes | |
| 4,993,463 A | 2/1991 | von Meyerinck | |
| 5,600,303 A | 2/1997 | Husseiny et al. | |
| 5,881,973 A | 3/1999 | Agajanian et al. | |
| 6,808,142 B2 | 10/2004 | Oki | |
| 6,863,243 B2 | 3/2005 | Konya et al. | |
| 2002/0104176 A1* | 8/2002 | Thomas et al. ............. 14/71.5 |
| 2002/0120392 A1 | 8/2002 | Stratton | |

(Continued)

FOREIGN PATENT DOCUMENTS

DE          3743393          3/1989

(Continued)

*Primary Examiner*—Timothy D Collins
(74) *Attorney, Agent, or Firm*—Ostrager Chong Flaherty & Broitman P.C.

(57) ABSTRACT

An aircraft (12) includes a servicing opening (26) and multiple service levels (82, 102). The service levels (82, 102) include a noncargo-based service level (82). The service levels (82, 102) are accessible through the service opening (26). An aircraft onboard primary servicing system (66) includes a primary service sub-system (151). An aircraft primary service coupler (154) is configured to attach to a corresponding terminal primary service coupler (152). The aircraft primary service coupler (154) and the terminal primary service coupler (152) providing at least one primary service therethrough.

17 Claims, 29 Drawing Sheets

U.S. PATENT DOCUMENTS

| | | |
|---|---|---|
| 2003/0028336 A1 | 2/2003 | Masar et al. |
| 2003/0105567 A1 | 6/2003 | Koenig et al. |
| 2004/0186634 A1 | 9/2004 | Lucky et al. |

FOREIGN PATENT DOCUMENTS

| | | |
|---|---|---|
| DE | 29612083 U | 9/1996 |
| EP | 0150686 | 8/1985 |
| GB | 673998 A | 6/1952 |
| GB | 674118 A | 6/1952 |
| GB | 2014948 A | 9/1979 |
| GB | 2231073 | 11/1990 |
| JP | 60042108 | 3/1985 |
| WO | WO 91/00214 A | 1/1991 |
| WO | WO9529094 | 11/1996 |
| WO | WO 02/42151 A | 5/2002 |
| WO | WO03072435 | 9/2003 |

* cited by examiner

AIRCRAFT HAVING A DUAL FLOOR SERVICING SYSTEM ASSOCIATED WITH AN OPERATIONAL GROUND SUPPORT SYSTEM

RELATED APPLICATION

The present application is a continuation-in-part (CIP) application of U.S. patent application Ser. No. 10/711,610 entitled "Operational Ground Support System" having a filing date of Sep. 28, 2004, which is a CIP application of U.S. patent application Ser. No. 10/847,739 entitled "Operational Ground Support System" having a filing date of May 17, 2004, which are incorporated by reference herein.

TECHNICAL FIELD

The present invention relates generally to aeronautical vehicle ground support systems and automated, controlled ground mobility. More particularly, the present invention relates to integrated systems and methods of providing ground support services and controlled mobility between touch down and takeoff of an aircraft.

BACKGROUND OF THE INVENTION

It is desirable within the airline industry to provide efficient aircraft servicing and ground mobility. Time involved in taxiing to and from gates and in performing various servicing tasks, is directly related to the amount of time an aircraft is able to spend in flight. The more an aircraft is in flight the higher the potential profits associated with that aircraft.

Servicing an aircraft includes passenger boarding and deplanning of the aircraft, cargo servicing, galley servicing, and passenger compartment servicing, which includes cabin cleaning. Timing, sequencing, fueling, air supply, potable water supply, waste water drainage, electrical supply, brake cooling, communications links, and the manner in which aircraft services are performed and provided regulate the turnaround time of an aircraft.

Currently, servicing is performed utilizing passenger-bridges and service vehicles for passenger servicing, galley servicing, cabin cleaning, fueling, air supply, electricity supply, waste water disposal, potable water refurbishment, and cargo handling. Typical passenger-bridges are capable of extending, through the use of telescoping sections, to mate with the aircraft. Passengers servicing refers to the enplaning and deplaning over passenger-bridges on a port side of the aircraft. Vehicles for galley servicing, cabin cleaning, fueling, waste water disposal, potable water refurbishment, and electricity supply are provided at points on either side of the aircraft. The passenger servicing task is performed sequentially with the galley and cabin cleaning servicing in order to prevent interference with passengers and servicing crewmembers.

The potential for interference with passengers and servicing crewmembers exists in forward portions of the aircraft since the passengers deplane in the forward portion of the aircraft and passengers and servicing crewmembers use the same aisles of the aircraft. Servicing crewmembers are able to service aft portions of the aircraft, when an aircraft requires such servicing, simultaneously with deplaning of the aircraft, as no interference exists during the deplaning between passengers and crew members in the aft portion of the aircraft.

Three main types of airline bridges currently exist for passenger enplaning and deplaning of an aircraft. The three types are an apron drive bridge, a radial bridge, and a fixed pedestal bridge. The apron drive bridge is the most complex due to its rotating and telescoping capabilities, which allow for some freedom in parking location of an aircraft on an apron. The radial bridge and the fixed pedestal bridge require that the aircraft be parked at a specific spot on the apron. The radial bridge is rotated to mate a bridgehead to a passenger door. The fixed pedestal bridge is the least expensive of the three main types of bridges. The fixed pedestal bridge has a fixed main portion and an adjustable bridgehead. The pedestal bridge has a bridgehead that retracts when an aircraft is approaching an apron and extends when the aircraft is parked, at which time the bridgehead docks to an aircraft passenger door.

The use of galley servicing, cabin cleaning, fueling, air supply, electric supply, waste water disposal, potable water refurbishment, and cargo handling vehicles can be time consuming due to the steps involved in servicing the aircraft and the aircraft servicing location availability. The servicing vehicles typically need to be loaded at a location that is a considerable distance from and driven over to an airline terminal of interest, mated to the aircraft, and unloaded to service the aircraft. Aircraft servicing location availability is limited since most vehicle servicing of the aircraft can only be performed from the starboard side of the aircraft to prevent interference with the passenger bridge on the port side of the aircraft. The hydrant fuel, aft cabin cleaning, and aft lavatory service trucks can access the port side. Mating of the servicing vehicles to the aircraft is also undesirable since an aircraft can potentially be damaged.

Current servicing of an aircraft is not efficient and current bridge designs are not physically applicable to newly introduced faster flying aircraft. For example, a sonic cruiser is being studied by The Boeing Company that has a canard wing in an upper forward portion of the aircraft, which interferes with current passenger bridge designs. Also, due to the relationship of aircraft servicing doors and aircraft wings, long turnaround times are required for servicing the sonic cruiser. The longer time spent servicing the aircraft on the ground negates the benefit of the faster flying capability in terms of overall aircraft utilization. System inefficiency of existing infrastructure and current aircraft fleet present restrictions encountered by the Sonic Cruiser.

Also, current systems and methods used for ground support of commercial aircraft are security limited. It is difficult to provide and maintain adequate and appropriate security with regard to an aircraft, due to the number of different services accessing the aircraft at multiple locations along either side of the aircraft while at a terminal gate.

Additionally ground support services can also adversely affect passenger experience with flying, as a result of the somewhat chaotic fashion in which ground support services are currently provided.

It is therefore desirable to provide improved aircraft servicing systems and methods with increased servicing efficiency and aircraft security, which also provide an improved passenger flying experience. It is also desirable that the improved servicing systems address both current infrastructure incompatibility limitations related to the introduction of aircraft and other inefficiencies associated with current aircraft and systems.

SUMMARY OF THE INVENTION

The present invention provides an aircraft that includes a servicing opening and multiple service levels. The service levels include a noncargo-based service level. The service levels are accessible through the service opening.

In another embodiment of the present invention, an aircraft onboard primary servicing system is provided that includes a primary service sub-system. An aircraft primary service coupler is configured to attach to a corresponding terminal primary service coupler. The aircraft primary service coupler and the terminal primary service coupler providing at least one primary service therethrough.

The embodiments of the present invention provide several advantages. One such advantage is the provision of an integrated operational ground support system that allows for aircraft servicing through the nose or through automated service ports, located on the lower lobe regions forward of the wings on the port and starboard sides of the aircraft. The stated embodiment allows for passenger ingress/egress, cargo ingress/egress, primary system and secondary system servicing, and health and maintenance monitoring through the nose or simultaneously through the use of multiple level servicing bridges on port and starboard sides of the aircraft. In so providing, the stated embodiment provides increased servicing efficiency through simultaneous servicing thereof and provides improved aircraft security.

Additional security is provided via other passive and active systems described herein. One such passive system is associated with the incorporation of an elevated and isolated flight deck. The isolated flight deck prevents unwarranted intruders and devices from entering a flight deck area. One such active system is a flight deck access system, which prevents access to the flight deck area without performing the appropriate access procedure.

Servicing through the nose of an aircraft can eliminate the need for side passenger and cargo doors for ingress/egress of passengers and cargo. The elimination of side doors allows for interior space of the aircraft to be more efficiently utilized for increased passenger seating. Forward loading also enhances the cargo space within an aircraft. Forward loading or loading through the nose of an aircraft eliminates the need for a wing carry through center section that typically splits the cargo hold of an aircraft into forward and aft compartments. Front loading simplifies the structure and reduces the weight of an aircraft by utilizing a single set of front doors instead of fore and aft cargo doors. In addition, the front doors are located forward of aircraft areas that experience prime bending loads, which maintains proper door seating over time.

Furthermore, another advantage provided by an embodiment of the present invention is the provision of a terminal carry-on system that allows for the pre-loading of carry-on articles into carry-on transport modules. The carry-on system provides increased efficiency in passenger ingress and egress, aids in minimizing any apprehensions that passengers may have in becoming separated from their articles, and minimizes competition between passengers in first accessing or utilizing a overhead compartment storage area or the like. The terminal carry-on system significantly increases ingress and egress speed by facilitating the stowage and retrieval of personal articles within a terminal prior to and after embarkation. Passengers are able to ingress without carrying carry-ons to their respective seats without competition from co-passengers for overhead stowage. Upon arrival to a terminal, the passengers may egress from the aircraft and retrieve their personal effects within the terminal.

Yet another advantage provided by an embodiment of the present invention is the provision of operational ground support systems that utilize passenger transport modules. The passenger transport modules are used to shuttle passengers into and out of an aircraft. Again increasing passenger ingress/egress efficiency and providing an improved passenger overall flying experience. The passenger ingress/egress modules allow an aircraft to operate out of airports, which do not have the above-stated docking ports. The transport modules also allow an aircraft to operate at remote airport locations during instances of high gate demand.

Moreover, additional advantages provided by other embodiments of the present invention are the provisions of a passenger-cargo loader/unloader and a portable ground servicing unit. These state embodiments allow for servicing of an aircraft from locations other than at airport interface terminals and provide similar through aircraft nose servicing, as stated above. These embodiments also account for airports where terminal availability is limited.

The present invention itself, together with further objects and attendant advantages, will be best understood by reference to the following detailed description, taken in conjunction with the accompanying drawing.

BRIEF DESCRIPTION OF THE DRAWINGS

FIG. 27 is perspective level plan view of a passenger level incorporating multiple servicing columns in accordance with an embodiment of the present invention.

DETAILED DESCRIPTION

Figure 1:
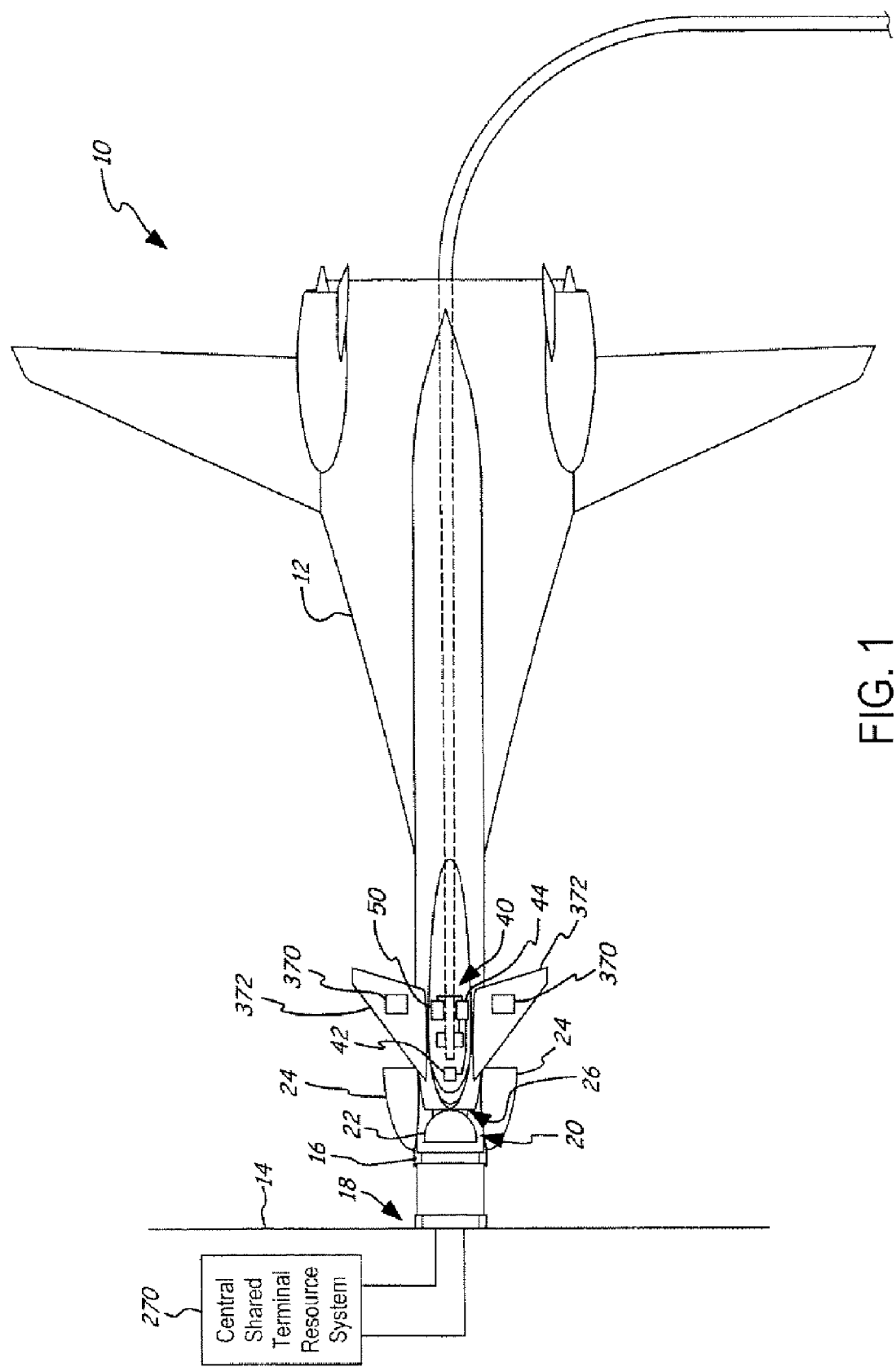
FIG. 1 is a top view of an integrated operational ground support system for an aircraft in accordance with an embodiment of the present invention.

In each of the following Figures, the same reference numerals are used to refer to the same components. While the present invention is described with respect to systems and methods of servicing an aircraft, the present invention may be adapted for various applications and systems including: aeronautical systems, land-based vehicle systems, or other applications or systems known in the art that require servicing of a vehicle.

In the following description, various operating parameters and components are described for one constructed embodiment. These specific parameters and components are included as examples and are not meant to be limiting.

Also, in the following description the terms "service", "services", and "servicing" may include and/or refer to any aircraft services, such as passenger ingress/egress services, cargo ingress/egress services, aircraft primary services, aircraft secondary services, galley services, cabin cleaning services, lavatory services, or other services known in the art. Primary services may include fuel, power, water, waste, air conditioning, engine start air, brake cooling, and other primary services. The stated primary services may be referred to as resources. Secondary services may include cabin cleaning services, galley services, trash services, and other secondary services.

Figure 2A:
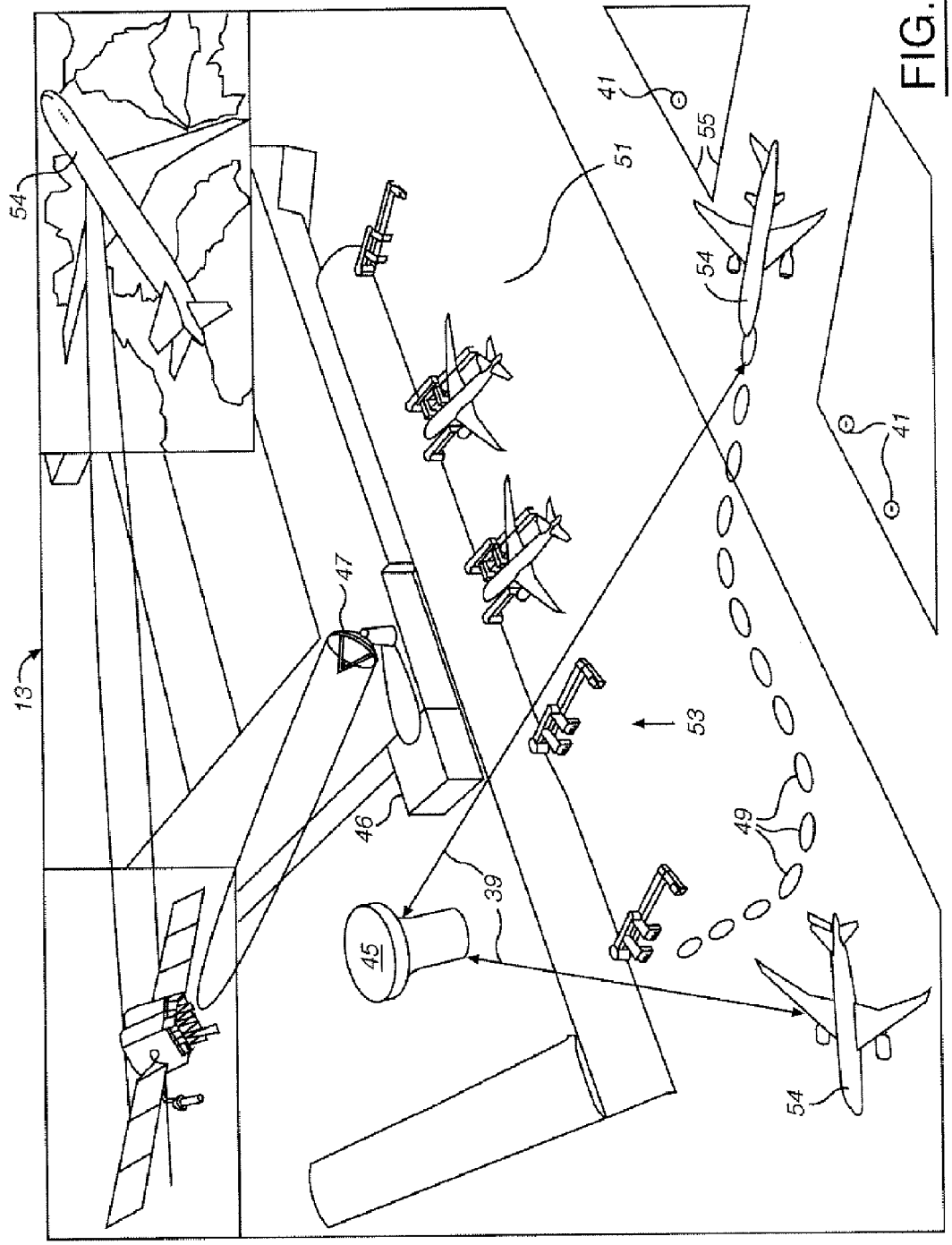
FIG. 2A is a top view of an airport illustrating aircraft guidance and mobility including aircraft departure in accordance with an embodiment of the present invention.
Figure 2B:
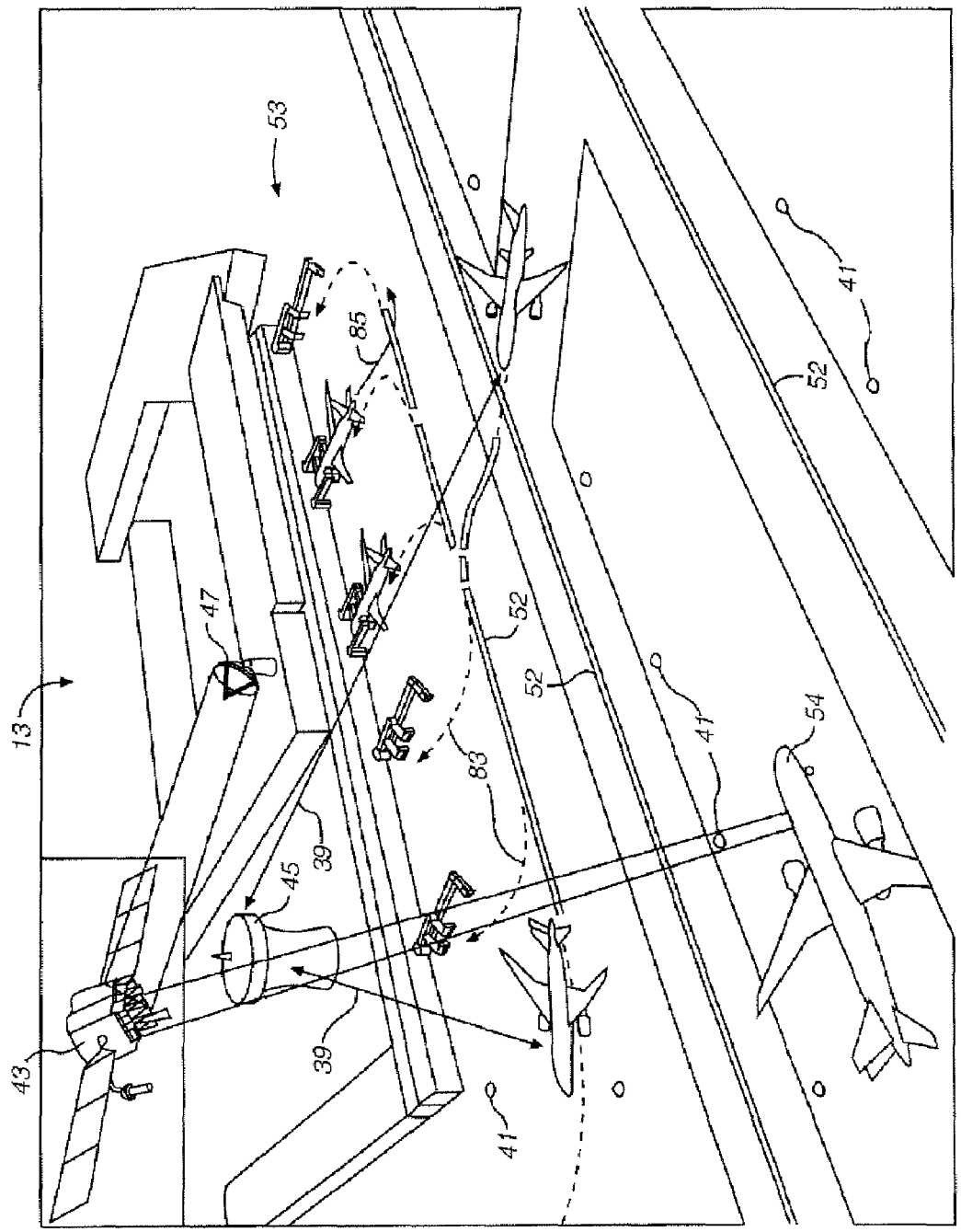
FIG. 2B is a top view of an airport illustrating aircraft guidance and mobility including aircraft arrival in accordance with an embodiment of the present invention.

Referring now to FIGS. 1-2B, a top view of an integrated operational ground support system 10 for an aircraft 12 and top views of an airport 13 illustrating aircraft guidance and mobility in accordance with an embodiment of the present invention is shown. Note that the aircraft shown in FIGS. 1-2B, as well as in FIGS. 3-9 and 11A-19, are for example purposes only, the present invention may be applied to various other aircraft known in the art. The integrated support system 10 includes the aircraft 12 and an airport interface terminal docking port 14 having a docking coupler or port 16. The aircraft 12 is shown at a particular gate 18 of the interface terminal 14. The aircraft 12 has a nose 20 that opens for the servicing of the aircraft 12 therethrough. The aircraft nose 20 may open in various manners. In the embodiment of FIG. 1, the nose 20 has an upper nose cap 22 and a pair of lower quarter covers 24, sometimes referred to as clamshell doors. The cap 22 and covers 24 are hinged to open in an upward direction and away from a service opening 26. Service opening 26 is one example of a service opening, other examples are provided below with respect to the other embodiments of the present invention. The interface terminal 14 services the aircraft 12 through the service opening 26. The interface terminal 14 provides such servicing through the use of various ground support service sub-systems, which are best seen in FIGS. 4-7. Other sample support sub-systems and integrated operational ground support systems are provided and described with respect to the embodiments of FIGS. 8-13.

The aircraft 12 may include an onboard aircraft terminal mating control system 40 for guidance of the aircraft 12 to and from the terminal 14. The onboard system 40 includes a global positioning system (GPS) or navigation system 42, which is in communication with GPS satellites 43 (only one is shown) and central tower 45 and is used by the controller 44 to guide the aircraft 12 upon landing on the ground to the terminal 14. This guidance may be referred to as vehicle free ramp operations. The airport infrastructure includes maintenance operations scheduling and support 46 and may be in communication with the aircraft 54 via the tower 45 or the ground antenna 47. Systems, equipment, and personal needed to perform unscheduled service requirements discovered in flight may be ready upon arrival of the aircraft 12 and 54 for such performance.

Guidance signals 39 are transmitted and received between the tower 45 and the aircraft 54 when on the tarmac 51. This assures that adequate ground separation is maintained and discreet source ground movement damage is minimized. The guidance signals are utilized for both arrival and departure as indicated by arrival arrows 83 and backup arrow 85.

The largest percentage of damage to an aircraft occurs while an aircraft is on the ground. The damage may occur when taxiing and colliding with other aircraft or ground equipment, or while parked at a terminal gate by support operations vehicles. The onboard system 40 guides the aircraft 12 by automated means and controls the speed and position of each individual aircraft while in motion. The onboard system 40 is tower controlled via automatic pilot and is employed for ground movement. By having aircraft at a particular airport under controlled motion, ground separation requirements can be reduced. A reduction in ground separation requirements increases airport capacity while reducing the risk of collision with other aircraft and objects.

Once the aircraft 12 is in close proximity with the terminal 14, a precision guidance system 50 is used in replacement of the navigation system 42. The precision guidance system 50 precisely guides the aircraft 12 to the docking port 16 using machine vision controlled pick and place robotics techniques known in the art. A near gate proximity guide-strip or guideline 52 is provided on the tarmac 51, which is used for rapid and precise guidance of the aircraft 12 to the docking port 16. A sample path of an aircraft is designated by the disks 49.

The ground support system 10 utilizes GPS cross runaway and tarmac route control. GPS cross runaway refers to the pavement connection between runways that the aircraft 12 crosses when taxiing to and from a terminal tarmac area 53. Tarmac route control refers to the position control of the aircraft 54 on the tarmac 51, which may include control of the aircraft 12, as well as other aircraft known in the art. Aircraft positions are monitored by the guidance system 50 inclusive of GPS via ground based antenna arrays 41 that may be in or on tarmac guide strips 55. Final precision guidance is performed via machine vision. The ground based antenna arrays 43 may be used to perform triangulation in determining aircraft position. Control of the aircraft 54 may be software customized to individualize airport requirements and configurations. The use of GPS cross runaway and tarmac route control in coordination with the guideline 52 enables rapid ground movement and control and precision gate alignment with minimal system implementation cost. In one embodiment of the present invention the guideline 52 is continuous to maintain control of the aircraft 12.

Once the aircraft 12 is staged to the terminal 14, a system based on machine vision technology orients the docking port 16 in vertical and horizontal directions. After alignment, the docking port 16 is extended and mated with the aircraft 12. Once the aircraft 12 is mated to the docking port 16 the clamshell doors 22 and 24 are opened and the aircraft 12 is serviced through the nose 20.

Figure 3:
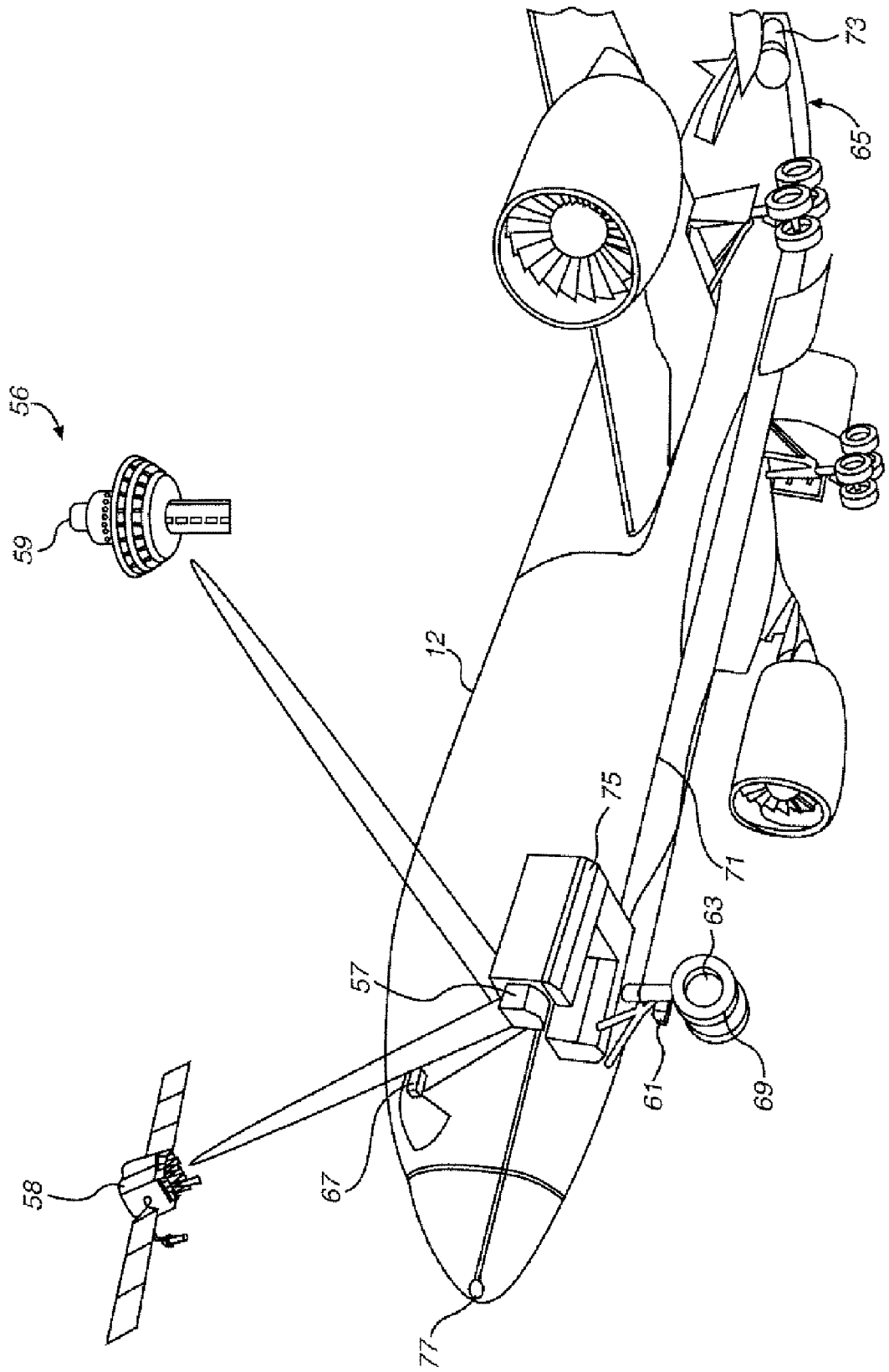
FIG. 3 is a perspective view of an aircraft guidance and mobility system in accordance with an embodiment of the present invention.

Referring now also to FIG. 3, a perspective view of an aircraft guidance and mobility system 56 in accordance with an embodiment of the present invention is shown. The guidance and mobility system 56 includes a motor drive speed and steering control panel 57 that is in communication with GPS satellites, such as satellite 58, and a radio control tower 59. The control panel 57 receives position information from the GPS satellites 58 for movement control. The control panel 57 also receives a radio control signal from the tower 59 for speed and route control to and from terminal gates. The guidance and mobility system 56 also includes an electronic and electrical control distribution bay 53, a power steering unit 61, a traction motor 63, and a power delivery system 65. The guidance and mobility system 56 may receive signals from the tower 45 for controlling the taxiing of the aircraft 12 to and from a terminal gate. This eliminates the need for wheel walkers and tail walkers, as commonly used for such taxiing.

The distribution bay 53 provides electronic control of and power to aircraft electronic systems. The control panel 57 may be part of the distribution bay 53 or separate as shown.

The power steering unit 61 is utilized to autonomously steer the aircraft 12 through use of the guidance system 56. The power steering system 61 may be overridden by a pilot of the aircraft 12 via the cockpit override 67 or by airport authority control that is external from the aircraft 12.

The traction motor 63 is a motorized wheel that may be located within the hub of the front wheels 69. The motor 63 may be an alternating current (AC) or direct current (DC) motor. The traction motor 63 is activated by the guidance system 56 to move the aircraft 12. The motor 63 may be used to decrease the traveling or taxiing speed of the aircraft 12 without the use of brakes.

The power delivery system 65 includes a supply line 71 and an auxiliary power unit 73. Power is supplied from the auxiliary power unit 73 to the distribution bay 53 via the supply line 71. The auxiliary power unit 73 may be of various types and styles known in the art.

The guidance system 56 may also include a bank of ultra capacitors 75 to supply load during peak power demands, such as when the aircraft 12 is initially moving from a rest position. This is sometimes referred to as a break away motion start. The guidance system 56 may also include a sensor 77 for close proximity guidance. The sensor 77 is coupled to the control panel 57. The sensor 77 detects objects forward of the aircraft 12, such as a terminal gate, and generates a proximity signal, which may be used by machine vision devices to accurately position the aircraft 12.

The guidance system 56 may support conventionally configured aircraft and use main engines as power mobility, while using the guidance control system 56 to guide movement of the aircraft while on the ground, and within proximity of the airport 13.

Figure 4:
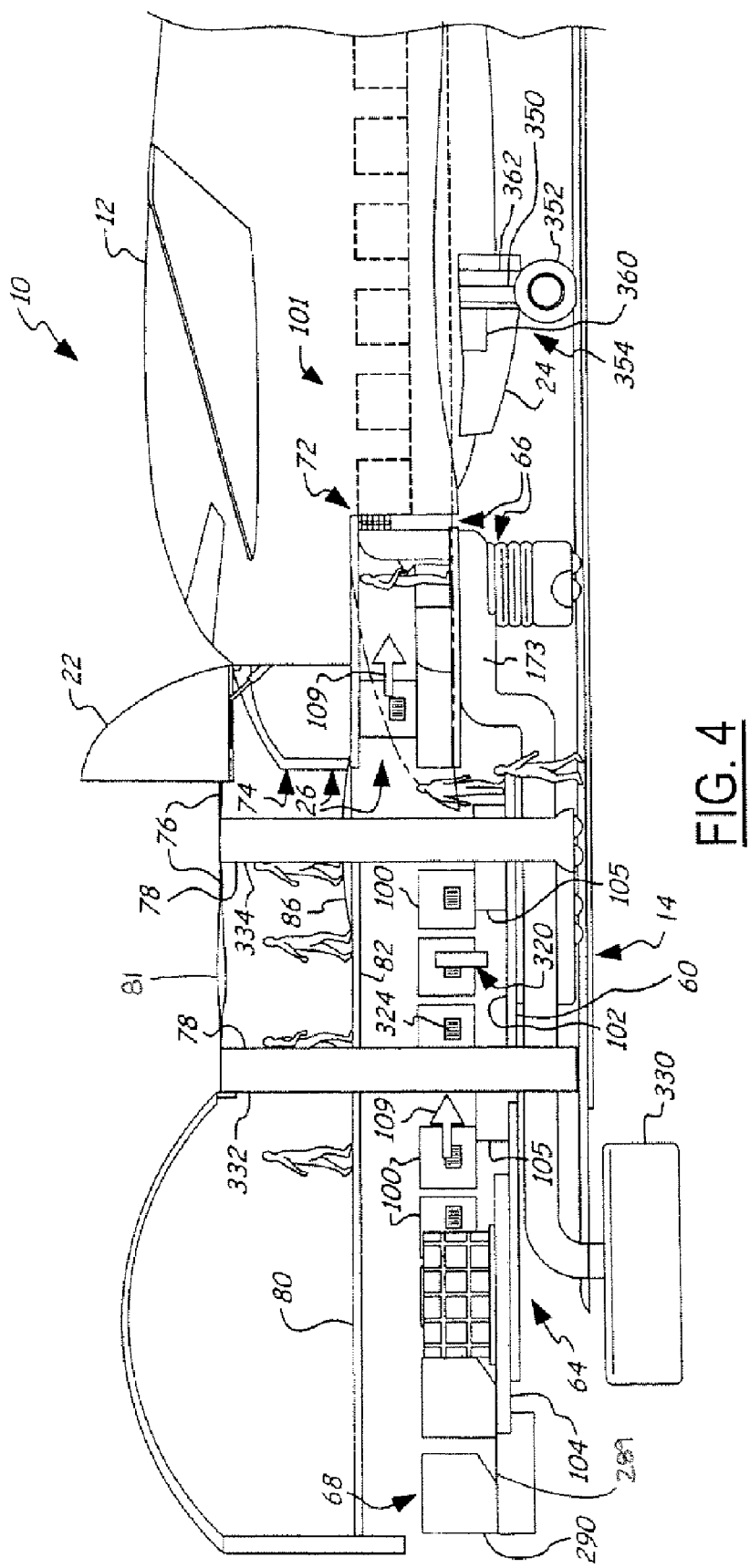
FIG. 4 is a side view of the integrated operational ground support system incorporating the use of an airport interface terminal docking port illustrated with a cargo elevator in a down state and in accordance with an embodiment of the present invention.
Figure 5:
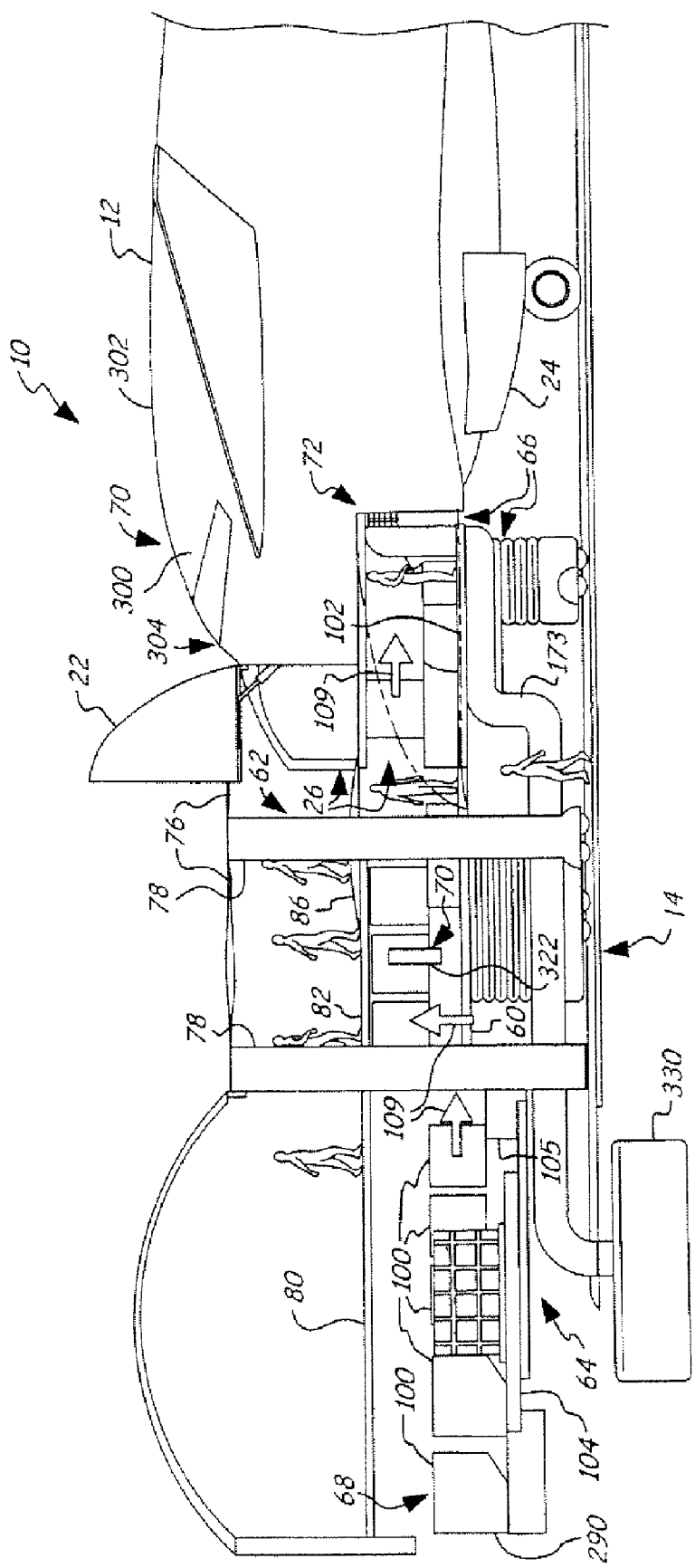
FIG. 5 is a side view of the integrated operational ground support system incorporating the use of an airport interface terminal docking port illustrated with a cargo elevator in an up state and in accordance with an embodiment of the present invention.
Figure 6:
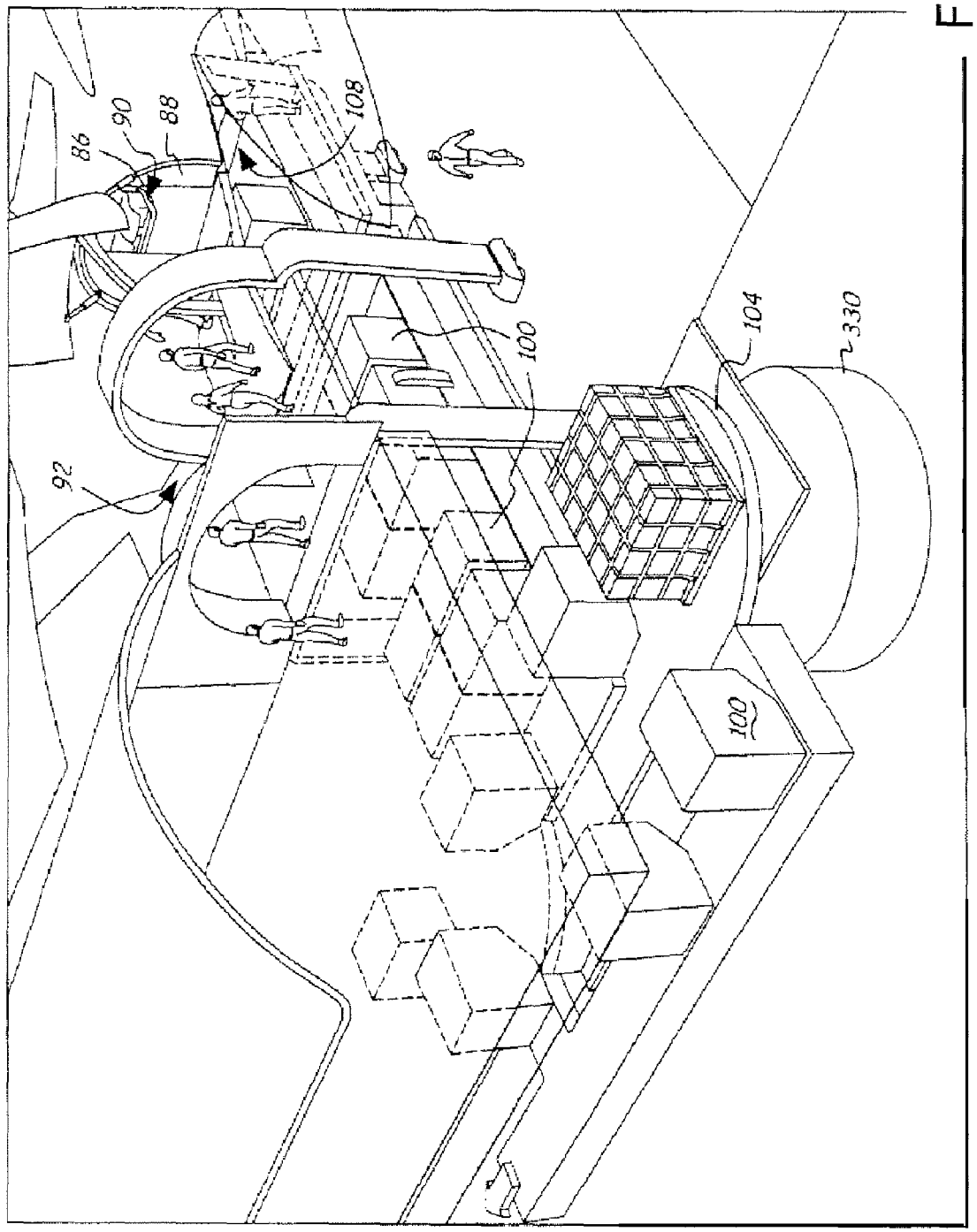
FIG. 6 is a perspective view of an integrated operational ground support system for an aircraft illustrating cargo handling in accordance with an embodiment of the present invention.

Referring now to FIGS. 4-6, side views of the integrated support system 10 are shown with a cargo elevator 60 in a "down" state and in an "up" state and a perspective view of the integrated support system 10 is shown illustrating cargo handling in accordance with an embodiment of the present invention. The integrated support system 10 includes various ground service support sub-systems, such as a passenger ingress/egress system 62, a cargo ingress/egress system 64, an aircraft primary service system 66, an aircraft secondary service system 68, a security system 70, and a health and maintenance monitoring system 72. Although only the service support sub-systems 62-72 are shown, other service-support sub-systems known in the art may be incorporated. Although the service support sub-systems 62-72 are shown as being associated with a particular level, other configurations may be utilized.

The passenger ingress/egress system 62 aids in the efficient ingress and egress of passengers to and from the aircraft 12. Passengers enter and exit to and from the interface terminal 14 through the terminal level portion 74 of the service opening 26. The interface terminal 14 has open glass ceilings 76 that are supported by columns 78. The passengers during the boarding process are guided through the terminal 14, over the extendable servicing bridge 81, on the terminal floor 80, to a terminal gate, such as gate 18. The passengers are then guided across an upper floor or terminal level 82 of the interface terminal 14 and over a coupler platform 86 to the aircraft 12.

The passengers, while being guided to and when arriving in the aircraft 12, experience the wide body interiors of both the aircraft 12 and the interface terminal 14. The passengers experience open, spacious, well lighted, and uncrowded views of the interface terminal 14 and the interior of the aircraft 12. This is best seen in FIGS. 6-9. The passengers may ingress and egress to and from the aircraft 12 in a twin column format, rather than through a narrow tunnel-loading ramp, as is the case with traditional systems. The integrated support system 10 thus provides a natural and inviting experience for the passengers.

Upon arrival of the aircraft 12, the nose 20 opens and the interface terminal 14 is mated with the service opening 26. The sidewalls and the ceiling panels within the wide body interior 86 of the aircraft 12 remain stationary. Partitions and/or doors 88 open between the passenger compartment 90 and the interface terminal 14. The passengers are presented with the interior 86 or the wide body interior 92 of the interface terminal 14 depending upon whether the passengers are entering or exiting the aircraft 12.

The cargo ingress/egress system 64 aids in the efficient loading and unloading of cargo, service carts, and other packages, containers, and baggages known in the art. When the aircraft 12 is at the gate 18, cargo that is loaded into the cargo containers 100 may be simultaneously loaded and unloaded at the tarmac level 102 of the interface terminal 14 while passengers are entering and exiting the aircraft 12 at the terminal level 82. The cargo containers 100 during the cargo loading process are transported to the terminal interface 14 and may be rotated on a cargo carousel 104 for proper orientation into the aircraft 12. The cargo containers 100 are then conveyed across the terminal interface 14 on conveyors 105 to the cargo elevator 60. The containers 100 are raised on the elevator 60 and are conveyed into the cargo area or lower hold 108 of the aircraft 12. The containers 100 are conveyed or positioned within the aircraft 12 using an onboard loading/unloading system 101. This loading/unloading system may be used for the containers 100, the galley carts 290, or may be utilized as a carry-on system to load the carry-on modules 452, shown in FIG. 10. This process is represented by arrows 109. The elevator 60 is shown in the down state in FIG. 4 and in the up state in FIG. 5.

The cargo containers 100 may be hitched together on both side tracks or rails like rail cars and conveyed over air bearings (not shown) to and from the aircraft 12. The containers 100 are conveyed longitudinally along the length of the aircraft 12 straight into and out of the lower hold 108. This eliminates the 90° shuffle of cargo containers from a cargo loader, along the side of and perpendicularly oriented with respect to an aircraft, to cargo areas fore and aft of the cargo loader, as normally experienced with traditional systems. The aircraft 12 may also have linear drives (not shown) to transport the containers and pallets on and off the aircraft 12. Locks and guides (not shown) may be located on the port and starboard sides of the cargo hold. Side locks enable automated insertion and removal of the containers and pallets without the need of human intervention to install and remove the forward and aft restraining dogs (not shown). The rails on the sides of the bottoms of the containers and pallets may be site modified to facilitate the automated side guide rail clamping, which reduces system complexity and increases robustness of the cargo system 64, while eliminating the need for manual intervention. Side guide rail clamping significantly reduces the costs exhibited by cargo handling and minimizes aircraft structural damage incurred from ground cargo activity experienced with prior cargo systems.

Figure 7:
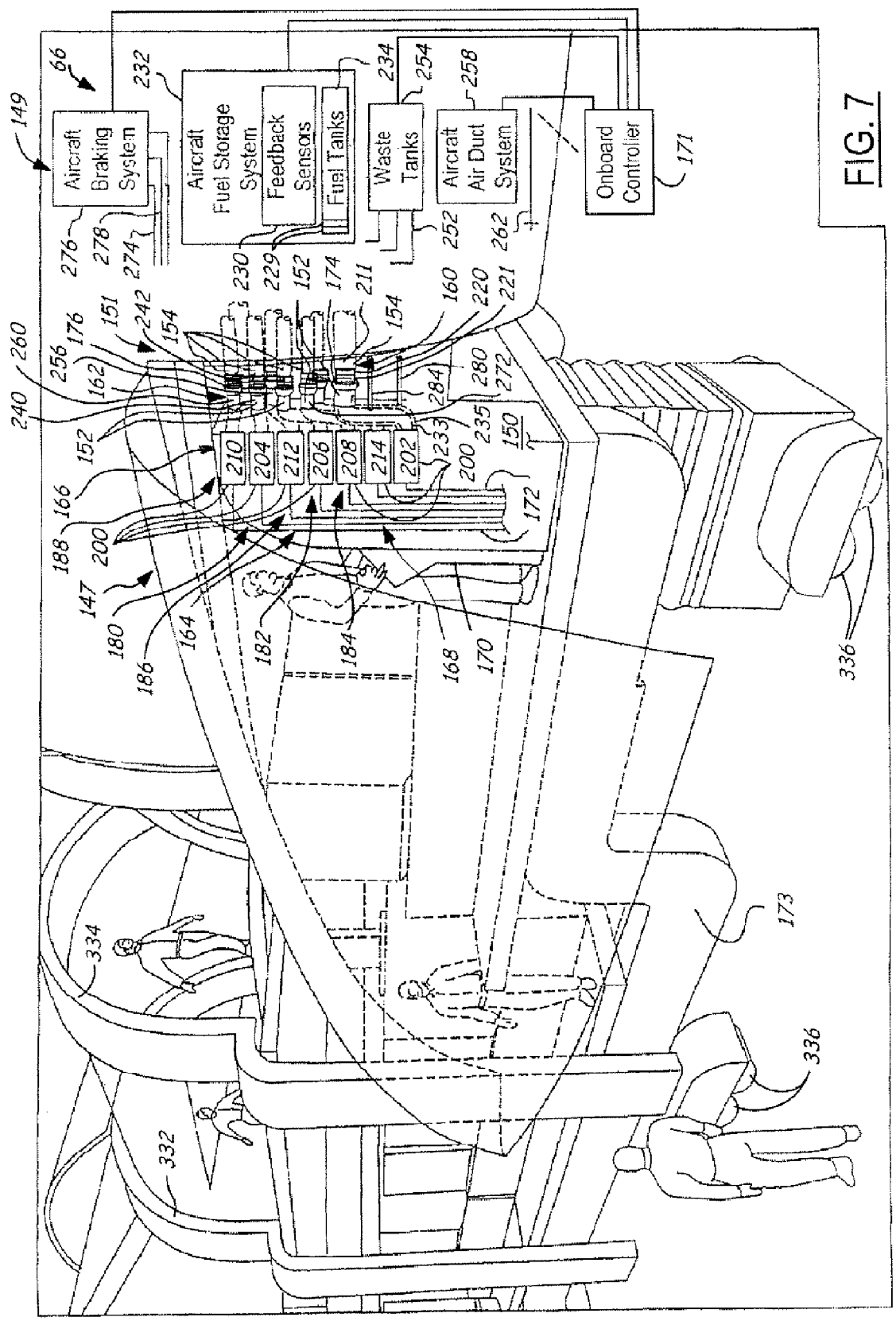
FIG. 7 is a side perspective view of the integrated operational ground support system illustrating an aircraft primary service system in accordance with an embodiment of the present invention.

Referring now also to FIG. 7, a side perspective view is shown of the integrated support system 10 illustrating the primary service system 66 in accordance with an embodiment of the present invention. The primary service system 66 includes a terminal service system 147, having a main control panel station 150, and an onboard aircraft service system 149. The primary service system 66 also includes multiple primary service support sub-systems 151. The main station 150 couples to the aircraft 12 via multiple primary service couplers. The primary service couplers include a first series of couplers or terminal couplers 152 and a second series of couplers or aircraft couplers 154. A terminal coupler may refer to a coupler that is on a terminal and may also include a coupler that is on a servicing bridge that is attached to a terminal or, in other words, a bridge primary service coupler. The first couplers 152 are located on the main station 150. The second couplers 154 are located on the aircraft 12 and mate with the first couplers 152. The primary service sub-systems 151 include a fuel system 160, an electrical power system 162, water systems 164, air systems 166, and a brake cooling system 168, which are controlled via a station controller 170.

Each of the primary sub-systems 151 has an associated conduit 172 that extends from the interface terminal 14 through a service conduit extension 173 to the associated first coupler 152. A large separation distance exists between a fuel hydrant 174 and an electrical coupler 176 to prevent electrical arcing to fuel. Other isolation techniques known in the art may also be utilized to separate the fuel hydrant 174 from the electrical coupler 176. Fuel is delivered by the hydrant 174 rather than by fuel trucks, which minimizes deicing requirements caused by cold soaked fuel and provides a constant and desirable temperature fuel year-round.

The water systems 164 include a potable water system 180, a gray water vacuum evacuation system 182, and a brown water vacuum evacuation system 184. The air systems 166 include an air conditioning system 186 and an engine start air system 188.

The fuel system 160, the water systems 164, the air systems 166, and the brake cooling system 168 have associated pumps 200, specifically a fuel pump 202, a potable water pump 204, a gray water vacuum pump 206, a brown water vacuum evacuation pump 208, an air start pump 210, an air conditioning pump 212, and a brake coolant pump 214. The pumps 200 may be located within the main station 150 or may be located elsewhere in the interface terminal 14 or at some other central location whereby multiple interface terminals may share and have access thereto.

The aircraft 12 is refueled through the high-pressure fuel hydrant 174 that extends to and couples with fueling ports 211 (only one is shown) on each side of the aircraft 12 when dual main stations are utilized. Machine vision ensures that the couplers 154 align in their proper orientation while redundant sensors 220 ensure that fuel does not begin to flow until coupling is complete. The sensors 220 may be in the form of contact limit sensors, which are activated when the clamping mechanism 221 is fully actuated. The sensors 220 may be backed up by continuity sensors, which indicate when the clamping mechanism is in a fully clamped position. Feedback sensors 230 from the aircraft fuel storage system 232 indicate when fueling is complete and the fuel tanks 234 are properly filled. Relief valves and flow back devices 229 may be used to ensure that any system malfunction does not result in spillage. The flow back devices 229 may be located at the level or point of entry into the fuel tanks 234 to prevent fuel from being retained in the lower level plumbing or lines (not shown) between the couplers 154 and the fuel tanks of the aircraft. The lower level lines may then be gas inerted after filling is complete.

The fuel hydrant 174 may be double walled and include an inner tube 233 with an outer jacket 235. Fuel is supplied through the inner tube 233. The outer jacket 235 is used to capture vapor and also serve as a relief flow back system. The feedback sensors 230 are connected to the fueling system 232. The fuel supply architecture of the interface terminal 14 provides for underground fuel storage.

Electrical power and potable water couplers 240 and 242, respectively, are mated similar to that of the fuel couplers 174 and 211. The vacuum couplers 250 connect to the holding tank dump tubes 252. The waste tanks 254 may then be vacuumed empty. The air conditioning coupler 256 connects to the aircraft air duct system 258. The engine start air coupler 260 connects to the aircraft engine start air lines 262. The air couplers 256 and 260 may be supplied with air from a central shared terminal resource system 270, as shown in FIG. 1, which may be shared by any number of interface terminals. Of course, other primary service sub-systems may also utilize the central shared terminal resource system 270. In addition, the interface terminals may evacuate fluids from aircraft to the central resource system 270 or to another shared resource system (not shown) separate from the resource system 270. The brake coolant coupler 272 is connected to the cooling lines 274 of the aircraft braking system 276. When dynamic field brakes are utilized heat dissipation within the braking system 276 may be accommodated through other techniques known in the art rather than through the use of the brake coolant 278. The electrical power coupler, the potable water coupler, the vacuum couplers, the air-conditioning coupler, the engine start air coupler, and the brake coolant coupler are not each numerically designated due to space constraints, but are shown and generally designated and included in the first couplers 152.

The main station 150, via the station controller 170, adjusts the amount of fluids, air, and electrical power supplied to and pumped from the aircraft 12. The main controller 170 may be in communication with an onboard controller 171, which is coupled to onboard systems and devices 232, 254, 258, 276, and other onboard systems and devices. A control panel operator may monitor the main station 150 and shut down any of the sub-systems 151 that are operating inappropriately or the main controller 170 may in and of itself shut down one or more of the sub-systems 151. Although a single main station is shown for a single side of the aircraft 12, any number of main stations may be utilized. The controllers 170 and 171 may be microprocessor based, such as a computer having a central processing unit, have memory (RAM and/or ROM), and associated input and output buses. The controllers 170 and 171 may be an application-specific integrated circuit or be formed of other logic devices known in the art.

The main station 150 also includes a static contact neutralizing connection 280 that connects with the aircraft 12 before connection by the other couplers 152 and 154. The neutralizing connection 280 eliminates any static charge that may exist between the aircraft 12 and the interface terminal 14.

A download/upload interface coupler 284 for system health and maintenance monitoring and control is also provided in the main station 150. The download/upload coupler 284 may be used to download and upload health and monitoring data, notice of service data, fluid level data, preventative maintenance and scheduling data, and other data between the aircraft and the interface terminal 14 and/or associated servicing bridge. This provides allows for such information to be monitored and transferred without need for various physical inspections. The download and upload coupler 284 and the controllers 170 and 171 may be part of a smart structure system. The download/upload coupler 284 is coupled to and is used for offboard monitoring, checking, and adjusting of aircraft onboard electric systems and controls.

The onboard controller 171 may be located anywhere on the aircraft 12. In one embodiment of the present invention the controller 171 and data accessible thereby is accessible to cockpit and ground personnel. The onboard controller 171 may be used to as a security monitor, as a service monitor, as a health and maintenance monitor, or as some other monitor known in the art. The controller 171 may be used to communicate the current status of various onboard systems and devices to the main station controller 170. The controller 171 may generate a service action plan laying out the maintenance or service steps needed for the aircraft 12 at any instant in time.

The aircraft secondary service system 68 has an associated secondary service level 289 and aids in the efficient servicing of the cabins, galleys, lavatories, and waste or trash containers of the aircraft 12. Although the secondary service system 68 is shown as being an integral part of the cargo ingress/egress system 64, it may be separated therefrom, as is shown with respect to the embodiment of FIGS. 11A-12. The secondary service system 68 utilizes the elevator 60, the cargo carousel 104, and the conveyors 105 to transport service carts and waste containers, such as galley carts 290, to and from the aircraft 12. The secondary service system 68 and the primary service system 66 may be operated using machine vision and automation technologies and associated or specific devices.

After cargo containers 100 are removed from the aircraft 12 the lower hold 108 is open to support cabin services. Cabin-cleaning attendants enter at the terminal level 82 to service the passenger cabins, lavatories, and galleys of the aircraft 12. Used galley carts 290 and refuses from the cabins and lavatories may be lowered within the aircraft 12 to the lower hold 108 before being conveyed off the aircraft 12. When the aircraft 12 is continuing through and is not fully serviced at the interface terminal 14, and only the front cargo containers are removed, then the services may be performed through forward galley elevator accommodations (not shown).

The galley carts 290 may be brought in and elevated into position from the lower hold 108 in the reverse order than they are used for cabin cleaning. The galley carts 290 may be stacked, which reduces the amount of space utilized thereby and allows for increased space for passenger seating, as well as shortened aircraft turn around times.

The secondary system 68 may include galley trash compactors (not shown) that are approximately the same physical size as the galley carts 290. Due to their size, the trash compactors may be removed, rotated, and replaced with and in a similar manner as that of the galley carts 290.

The security system 70 has two parts. The first part is passive and the second part is active. The first part is directed to the architecture and design of the integrated support system 10. The integrated support system 10 is designed such that passengers and cargo are passed through a single opening, specifically the service opening 26, and the flight crew is separated from the terminal level 82 and passengers thereon including passenger cabins and compartments. The use of a single opening for aircraft servicing allows for security monitoring of both passengers and cargo to be performed at a single location. The flight crew is located in a separated and elevated flight crew deck area or cabin 300 within a hump 302 of the fore part 304 of the aircraft 12. The hump 302 not only provides increased security for the flight crew, but also allows crew pre-flight checks during unload/load sequences, shortens aircraft turn around time, and decreases length of the aircraft 12 for equivalent aircraft capacity.

The second part includes a barcode screening system 320, which is used to monitor the cargo containers 100 entering and exiting the aircraft 12. Although the barcode screening system 320 is shown as being incorporated into the interface terminal 14, it may be incorporated into the aircraft 12. A bar code reader 322 is mounted at the tarmac level and reads barcodes 324 on the cargo containers 100. Improper bar codes may be detected at the main station and the associated cargo containers may be removed from the interface terminal 14 and checked.

The health and maintenance monitoring system 72 aids in the offboard monitoring and checking of aircraft systems. The health monitoring system 72 facilitates the exchange of data between ground maintenance and support and the aircraft 12. This allows for the evolution of real time structural and aircraft system monitoring and maintenance. Structural stress cycles and intensity may be tracked. The health monitoring system 72 allows fleet maintenance to predict when maintenance is needed and perform the appropriate maintenance ahead of schedule rather than to react to a malfunction and cause undesired downtime to perform the needed maintenance and component replacement. The health monitoring system 72 includes the download/upload interface coupler 284 and other electronics and electrical control and monitoring devices, such as gauges, switches, video screens, audio devices, and other controls and monitoring tools known in the art. These controls and monitoring tools may be located within the main station 150, elsewhere in the interface terminal 14, or offboard the interface terminal 14 at a central monitoring station, such as within the central shared terminal resource system 270. The health monitoring system 72 reduces inspection costs while providing a broader margin of safety.

The interface terminal 14 is extendable to the aircraft 12 and as such the service conduit 173 are also extendable via the service conduit extension and the take-up reels 330. The interface terminal 14, as shown, includes a first support column 332 and a second support column 334. The first support column 332 is stationary and the second support column 334 is mobile. The second support column 334 and the main station 150 are on wheels 336 and may be extended away from the gate towards the aircraft 12. The main station 150 may control extension of the interface terminal 14. The service conduit extension 173 may be telescoping and be extended to or retracted from the aircraft 12.

The aircraft 12 may include one or more motor wheel assemblies 350 with motor wheels 352 for tarmac movement and mobility. The motor wheel assembly 350 can be incorporated into the front trucks of the aircraft 12. Incorporation of motor wheel assembly 350 economically facilitates ground mobility requirements of the aircraft 12. The motor wheel assembly 350 may be used in replacement of or in combination with engine thrust and towing trucks. The use of the motor wheel assembly 350 minimizes human error and increases safety and integrity of an aircraft 12.

The motor wheel assembly 350 is of the traction motor type and can be either designed as an AC or DC unit. Modern traction motors are capable of producing large torque to weight ratios. The motor wheels 352 may be located and mounted on the front steerable wheel assembly 354 of the aircraft 12. The motor wheels 352 may be spun up prior to touch down of the aircraft 12 on a landing strip or runway and reduce tire wear and increase control during a breaking sequence on a slick runway.

The motor wheel assembly 350 may be staged over the guide-strip 52 by the GPS system 42 and thus allows the guide strip 52 and the ground based radio antennae arrays to precisely guide the aircraft 12 over a prescribed directed and controlled route to and from the interface terminal 14. The motor wheel assembly 350 may be controlled by a centralized computer ground control system, such as within the central resource system 270, of an airport to assure proper separation of ground traffic and significantly enhance the efficiency, safety and speed of ground mobility. The motor wheel assembly 350 may be used instead of aircraft primary engines, when taxiing on the tarmac, which reduces fuel consumption. The use of the motor wheel assembly 350 also eliminates the need for ground personnel to guide the aircraft 12.

The aircraft 12 may also include a dynamic braking assembly 360. Direct current (DC) electric power supplied to drive the wheels 352 may be controlled to reduce the speed of the aircraft 12. The electrical fields of wheel motors 362 perform as a generator when being externally driven, such as during landing. The electrical fields of the wheel motors 362 are positively crossed to generate a large amount of electromagnetic field energy. Dynamic braking can supply adequate energy to charge ultra-capacitors, which can hold that energy in reserve to be available on demand. The stored energy may be used as breakaway starting energy when aircraft motion is initiated under motor wheel power.

Figure 8:
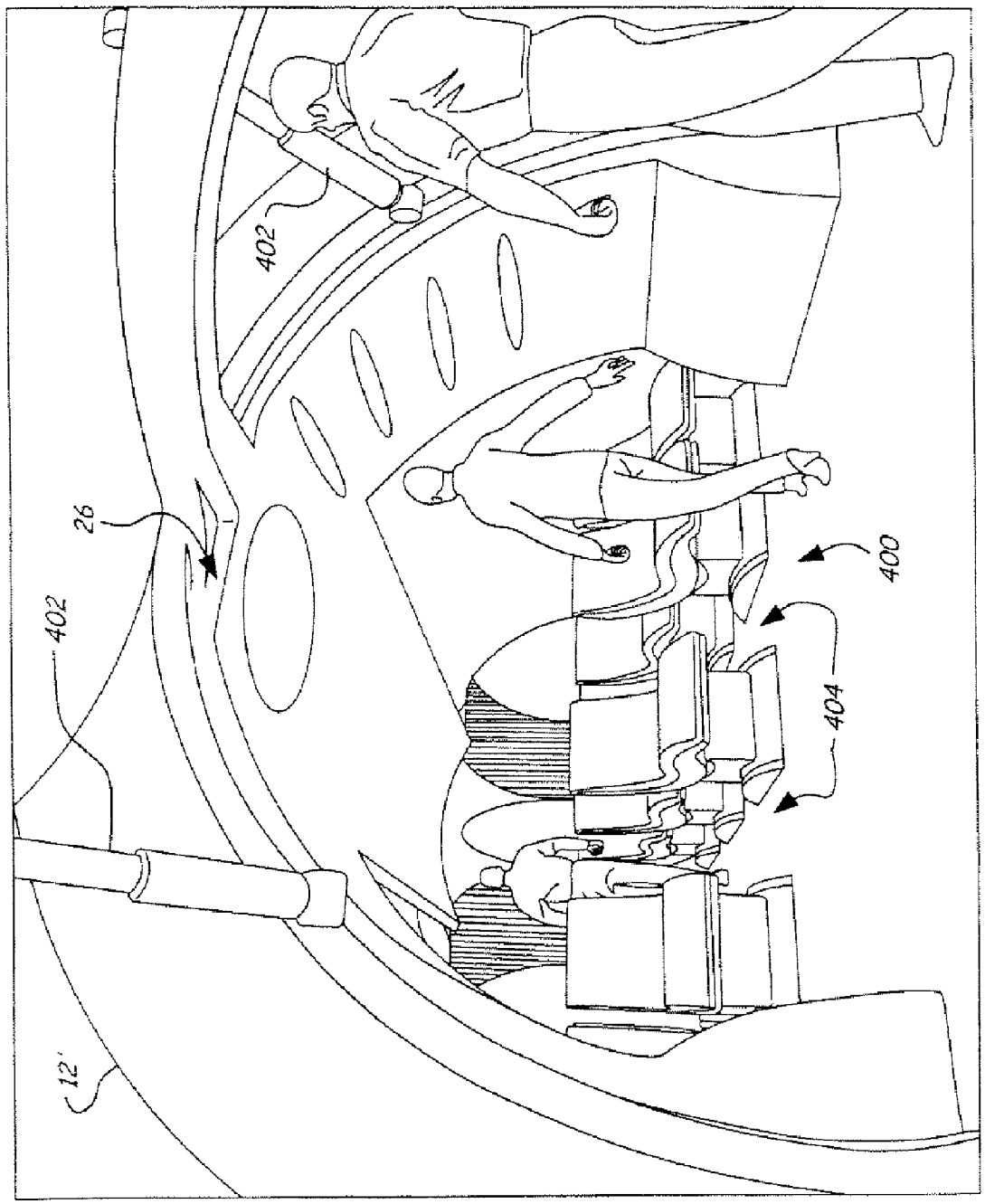
FIG. 8 is a front perspective view of a passenger compartment portion of a nose service opening of the aircraft in accordance with an embodiment of the present invention.

Referring now to FIG. 8, a front perspective view of a passenger compartment or cabin portion 400 of a nose service opening 26' of an aircraft 12' in accordance with an embodiment of the present invention is shown. The wide-open interior of the passenger cabin 400 can be viewed from the service opening 26'. A pair of hydraulic lifts 402 is shown for the opening of the upper cap (not shown, but similar to upper cap 22). Passengers may enter the aircraft 12' and proceed in columns down aisles 404. Although an aircraft is shown having a twin aisle configuration, a similar configuration may be utilized for a single aisle aircraft.

Figure 9:
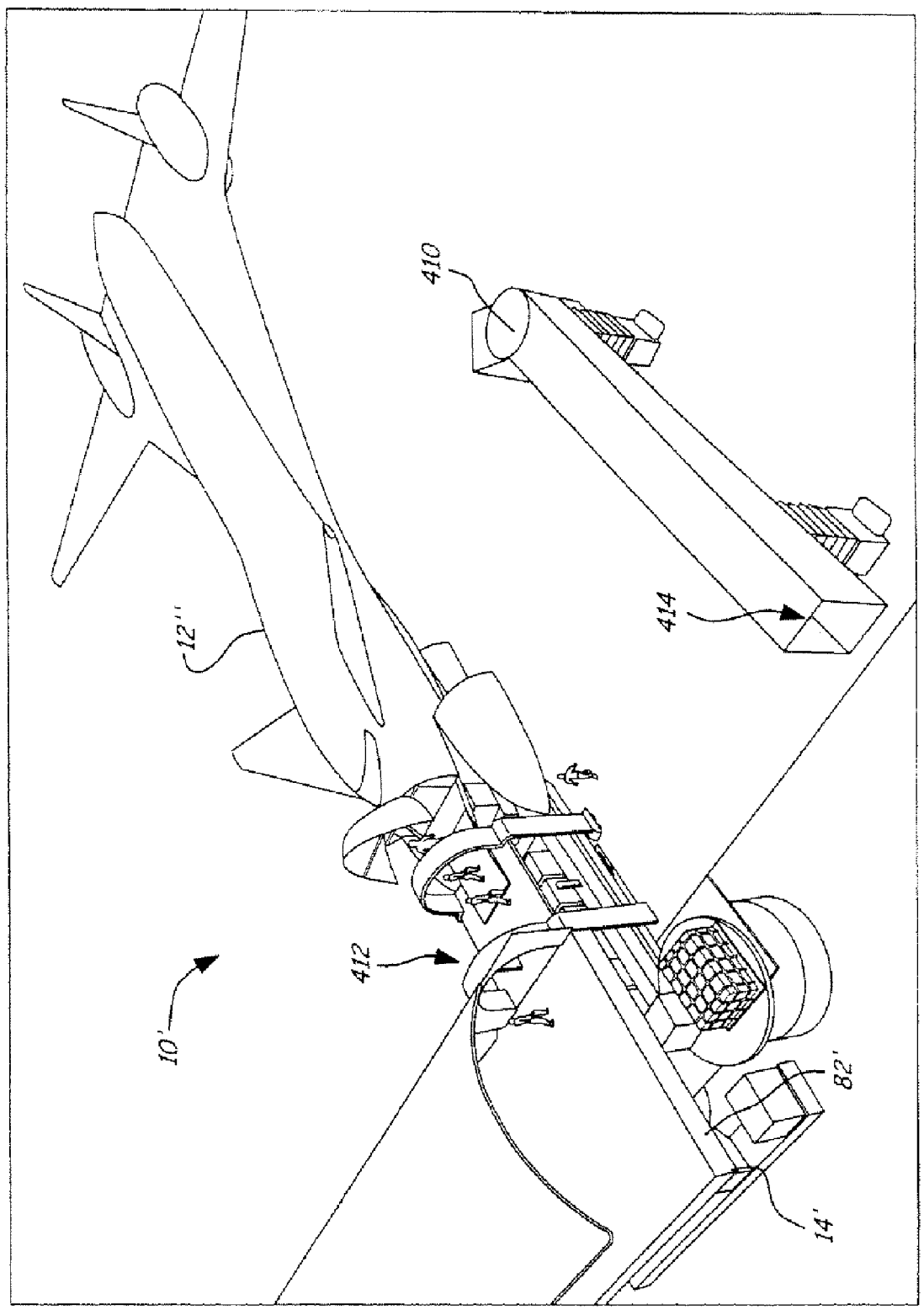
FIG. 9 is a perspective view of an integrated operational ground support system for an aircraft incorporating the use airport interface terminals for both a nose opening aircraft and a non-nose opening aircraft in accordance with an embodiment of the present invention.

Referring now to FIG. 9, a perspective view of an integrated operational ground support system 10' for an aircraft 12" is shown that incorporates the use of an airport interface terminal 14' that provides for servicing of both nose opening aircraft, such as aircraft 12", and non-nose opening aircraft (not shown) in accordance with an embodiment of the present invention. The integrated support system 110' includes the interface terminal 14' that is similar to the interface terminal 14, but further includes a traditional style servicing bridge 410. The interface terminal 14' has a first gate 412 associated with the aircraft 12" and a second gate 414 that is associated with the servicing bridge 410. Passengers may ingress and egress from nose opening aircraft and non-nose opening aircraft over the terminal level 82' of the interface terminal 14'.

Figure 10:
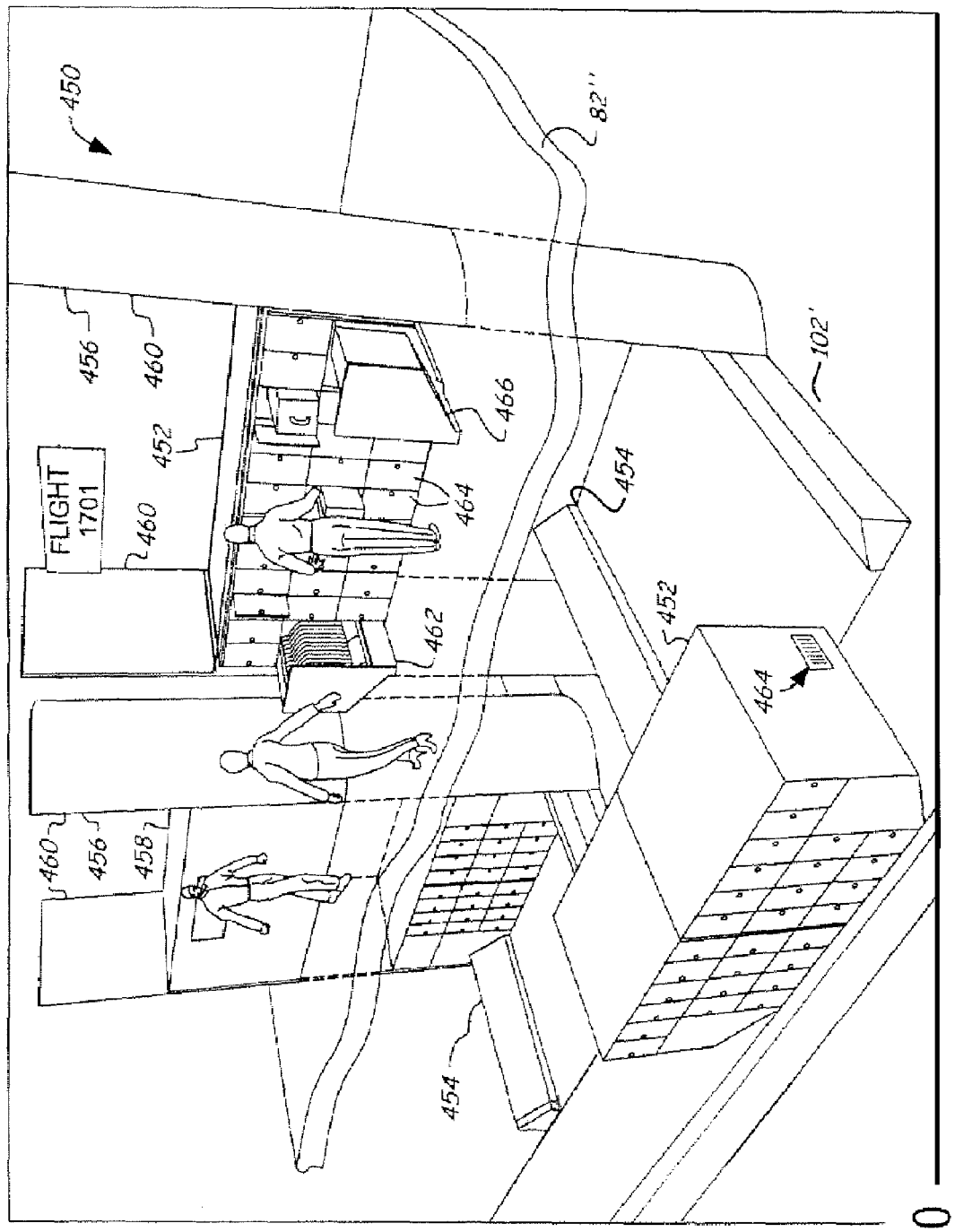
FIG. 10 is a perspective view of a terminal carry-on system in accordance with another embodiment of the present invention.
Figure 11:
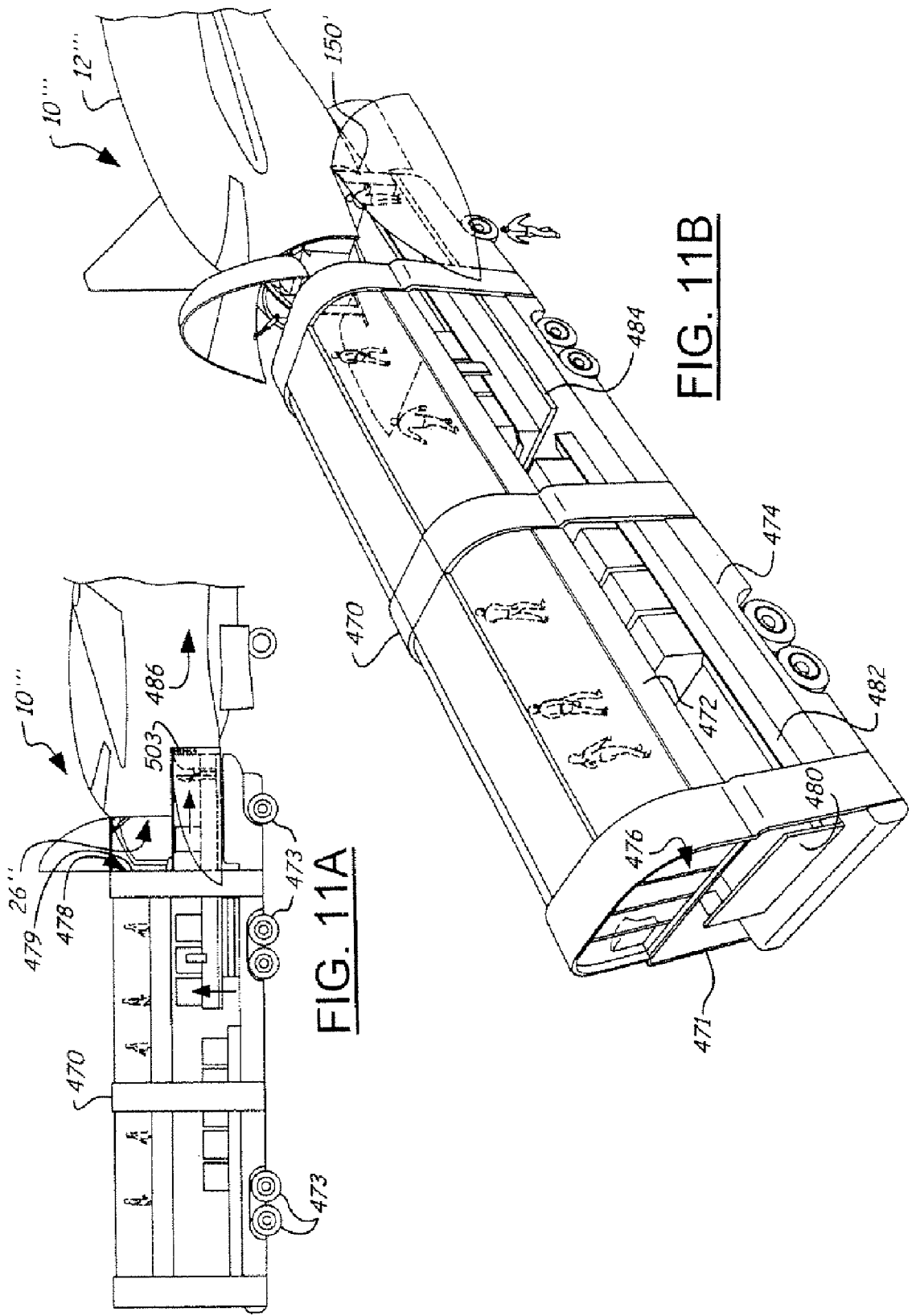
FIG. 11A is a side view of an integrated operational ground support system incorporating the use of a passenger/cargo loader-unloader in accordance with another embodiment of the present invention.
FIG. 11B is a perspective view of the integrated operational ground support system of FIG. 10A.

Referring now to FIG. 10, a perspective view of a terminal carry-on system 450 in accordance with another embodiment of the present invention is shown. The terminal carry-on system 450 includes carry-on modules 452, which are loaded by passengers within an interface terminal, such as the interface terminals 14 and 14'. The carry-on modules 452 are then conveyed via carry-on module conveyors 454 into an aircraft having an associated onboard carry-on system. The carry-on modules 452 are raised and lowered from the terminal level 82" via elevators 456. The carry-on modules 452 may also be conveyed, similar to the cargo containers 100 above, into the lower hold and through a nose service opening of an aircraft, such as service opening 26. The carry-on modules 452 may be replaced with false partitions 458 (only one is shown) to prevent passengers from entering areas between elevator columns 460 when the carry-on modules 452 are in transit.

The carry-on modules 452 may be designed to provide both cloak closets 462, carry-on cubbyhole lockers 464, as well as other carry-on containers or compartments known in the art, such as the compartment 466. The carry-on modules 462 may be loaded into a forward area of a cargo hold using a last on first off method.

The carry-on modules 452 may have bar codes 464, as shown. The bar codes 464 may be checked by a security system, such as the security system 70, while in transport to an aircraft.

After passengers have cleared security and have arrived at their gate of embarkation, they may place cloaks and carry-on luggage into the carry-on modules 452 at the gate. Upon filling of the carry-on modules 452, the carry-on modules 452 are then lowered down to the tarmac level 102' and directly conveyed into the appropriate aircraft. This process alleviates apprehensions passengers may have that are directed to becoming separated from their luggage, since they are able to load it themselves. In using the carry-on system 450, passengers need not compete with other fellow passengers for carry-on space within an aircraft. The carry-on system 450 also decreases boarding and disboarding times.

Referring now to FIGS. 11A and 11B, a side view and a perspective view of an integrated operational ground support system 10''' incorporating the use of an aircraft passenger/cargo loader-unloader 470 in accordance with another embodiment of the present invention is shown. The passenger/cargo loader-unloader 470 is mobile and may be used in replacement of an interface terminal and thus also has various ground support service sub-systems. The passenger/cargo loader-unloader 470 has a stand-alone support structure 471, such as a frame or body, and is on wheels 473. The passenger/cargo loader-unloader 470 may have an associated drivetrain, driveline, or the like (not shown) and may be driven using controls located at a main station 150'.

The passenger/cargo loader-unloader 470 also includes a terminal level 472 and a tarmac level 474. The terminal level 472 is used as a passenger servicing floor and the tarmac level 474 is used as a cargo transport floor. Passengers may enter the passenger/cargo loader-unloader 470 in the rear 476 at a terminal gate and exit in the front 478 through the docking port 479 and the service opening 26" of the aircraft 12'''. The terminal level 472 may have various passenger accommodations commonly found at an airport, in an airport terminal, or on an aircraft, such as passenger seating, lounge chairs, lavatories, vending services, food and beverage services, or other passenger accommodations. Cargo may enter in the rear 476 over a cargo gate/ramp 480 onto a cargo platform 482 and conveyed across the cargo platform 482 onto a hydraulic lift platform 484, which raises the cargo to the cargo hold level 486 of the aircraft 12''', via the main station 150'. Once raised the cargo may then be conveyed into the aircraft 12'''.

The passenger/cargo loader-unloader 470 is useful when it is necessary to load and unload passengers and cargo from an aircraft on a tarmac due to capacity limitations at terminals within an airport. The passenger/cargo loader-unloader 470 also allows for simultaneous ingress and egress of passengers and cargo from the aircraft 12''', similar to that of the interface terminals 14 and 14'.

Although the loader/unloader 470 is shown as being utilized in conjunction with and mating to a nose of an aircraft, the loader/unloader 470 may be easily modified to mate to port or starboard sides of an aircraft. For example, the loader/unloader 470 may be used to service the aircrafts illustrated in FIGS. 14-16. The loader/unloader 470 may mate with service openings in the lower lobe regions forward of the wings on the port and starboard sides of the aircraft.

Figure 12:
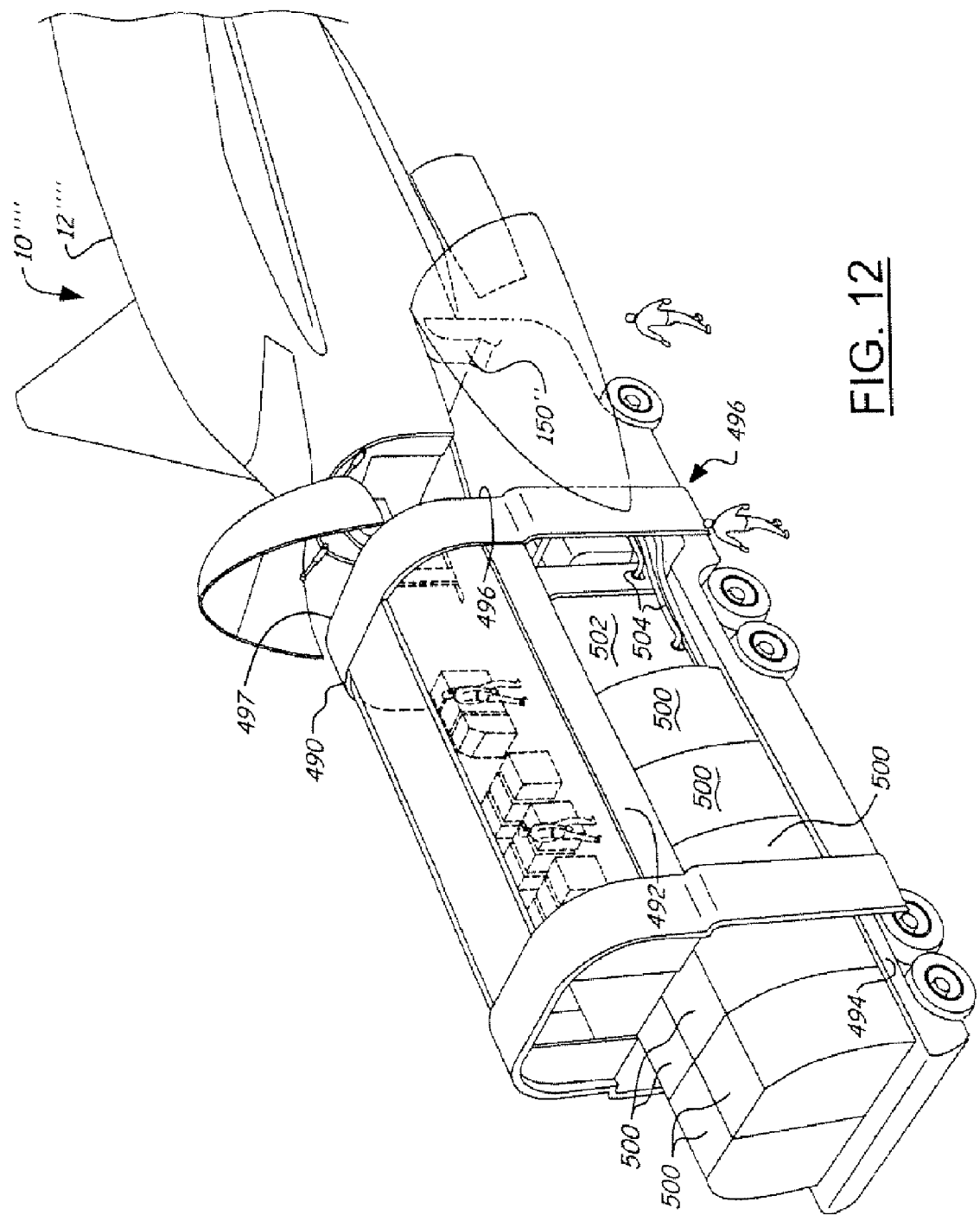
FIG. 12 is a perspective view of an integrated operational ground support system incorporating the use of a portable ground servicing unit in accordance with another embodiment of the present invention.

Referring now to FIG. 12, a perspective view of an integrated operational ground support system 10'''' incorporating the use of a portable ground-servicing unit 490 in accordance with another embodiment of the present invention is shown. The ground-servicing unit 490 may also be considered as an aircraft loader/unloader and has various ground support service sub-systems. The ground-servicing unit 490 is also mobile and may be used in replacement of an interface terminal. The ground-servicing unit 490 also includes a terminal level 492 and a tarmac level 494. The terminal 492 is used as a secondary service floor and the tarmac level 494 is used as a primary service floor. Secondary aircraft services may be provided on the terminal level 492. For example, galley carts, lavatory carts, trash carts, and other service carts may be conveyed onto the terminal level 492 from the rear and conveyed into the aircraft 12'''' through the front 496 or docking port 497 of the ground servicing unit 490. The lower portion 498 of the ground-servicing unit 490 is similar to that of an interface terminal, such as the interface terminals 14 and 14', in that it includes a main station 150" that couples to the aircraft 12''''.

Various tanks and supply holding units 500 reside on the tarmac level 494 of the ground-servicing unit 490. The tanks and holding units 500 may be separate containers or may be part of a single segregated unit, as shown. The tanks and holding units 500 may be used to supply and extract materials, such as fuel, water, air, and coolant, as well as power to and from the aircraft 12''''. The tanks and holding units 500 may include a fuel tank, a potable water tank, a gray water tank, a brown water tank, an air start tank, an air-conditioning tank, an electrical supply holding unit, as well as other tanks and holding units known in the art. The materials may be supplied to and pumped from the aircraft 12'''' using primary service couplers 503, which are similar to the primary service couplers 152 and 154, pumps (not shown), and lines 504. The pumps may be within a pump housing 502. The pump housing 502 may contain pumps similar to pumps 202-214 above.

The loader/unloaders 470 and 490 are for example purposes, of course, other configurations may be utilized. As one example, the loader/unloaders 470 and 490 may be combined, such that a first level or upper level is used for passengers and secondary services, and a second level or lower level is used for cargo and primary services. The loader/unloader 470 and 490 may utilize a mating system for coupling to the aircraft 12'''. The mating system may be similar to the aircraft/terminal mating system 751 described herein.

Figure 13:
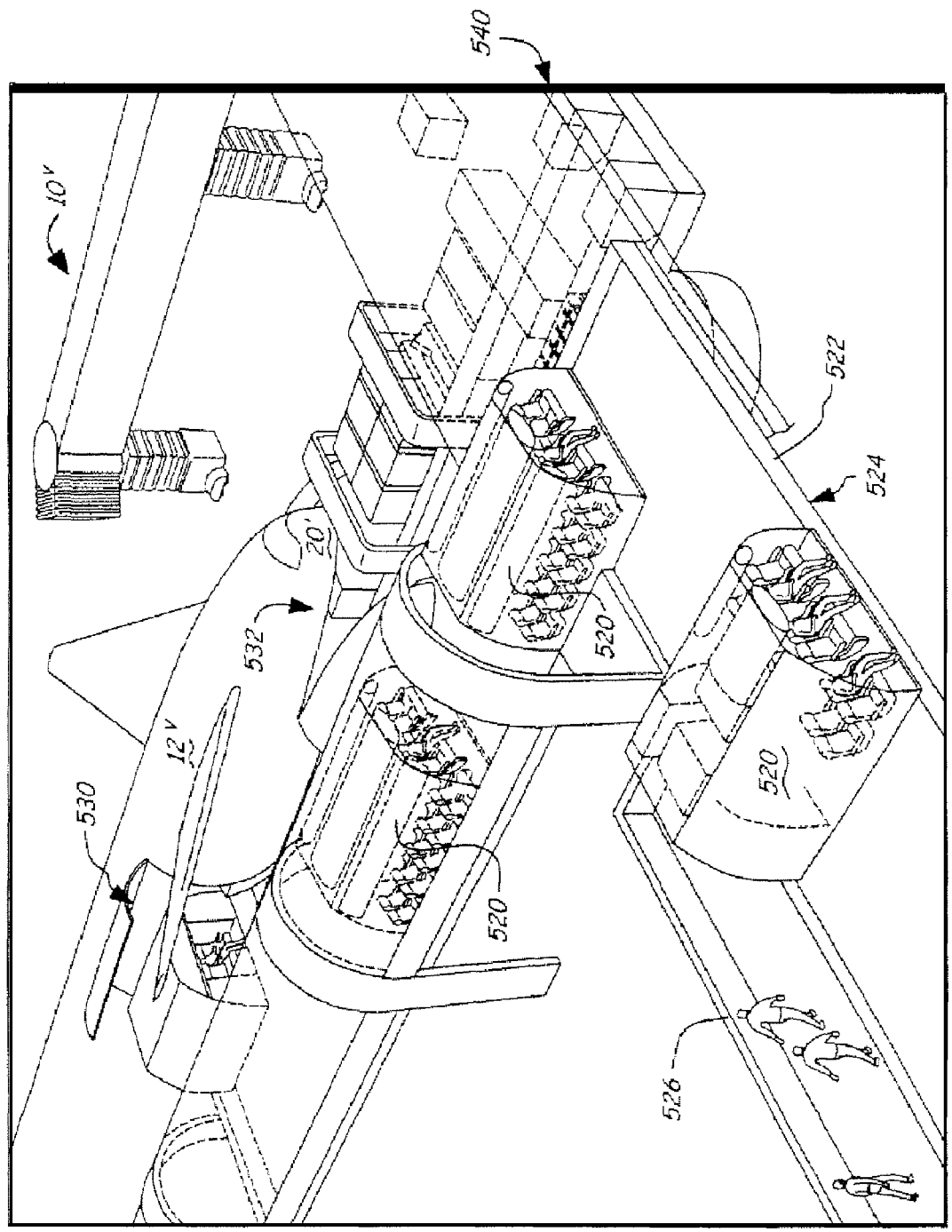
FIG. 13 is a perspective view of a an integrated operational ground support system incorporating the use of passenger transport modules in accordance with still another embodiment of the present invention.

Referring now to FIG. 13, a perspective view of a an integrated operational ground support system $10^V$ incorporating the use of passenger transport modules 520 in accordance with still another embodiment of the present invention is shown. The integrated support system $10^V$ includes an interface terminal 522 configured to shuttle the passenger modules 520 to and from an aircraft $12^V$. The passenger modules 520 are shuttled over a railway type system 524 to the aircraft $12^V$. Passengers may pre-board the passenger modules 520 into their respective assigned seats at a gate 526 and then be shuttled into the aircraft $12^V$. The assigned seats within the passenger modules 520 are the same assigned seats used on the aircraft $12^V$. Once the modules 520 are positioned within the aircraft $12^V$ they are locked into place. This increases efficiency in the loading of passengers and carry-ons into segmented portions of an aircraft.

The passenger modules 520 are similar in shape and have a similar interior as that of an aircraft. The passenger modules 520 may include over head compartments, comfort and convenience features, such as air-conditioning controls, crew-member call buttons, head set jacks, lavatories, and other comfort and convenience features known in the art. Although the passenger modules 520 are shown as being loading into a side 530 of the aircraft 12$^V$, they may be loaded into the front 532 of the aircraft 12$^V$ through a service opening, such as opening 26.

The interface terminal 522 also includes the cargo-loading portion of the integrated support system (of FIGS. 4-7), represented by numerical designator 540. Cargo is simultaneously loaded through the nose 20' of the aircraft 12$^V$. Once the passenger modules 520 and cargo are loaded the nose 20' closes and the aircraft 12$^V$ departs from the interface terminal 522. The process is reversed when the aircraft 12$^V$ arrives at its destination.

The above-described aircraft is also easily converted from a passenger aircraft to a freighter aircraft. Traditional aircraft are configured such that the interior passenger payloads, seats, lavatories, galleys, stow bins, etc., must be broken down into pieces and removed through the passenger entry door in order to convert from a passenger aircraft to a freighter aircraft. With a front loader configuration or an aircraft that allows loading and unloading through the nose, the passenger payloads can be installed as pre-built modules during assembly of the aircraft and later removed for rapid freighter conversion straight through the nose of the aircraft. System connections may be designed for quick connect and release. Cargo floors and liners may be designed for rapid installation and removal. This also facilitates rapid refurbishment when desired and rapid livery changes when ownership of the aircraft is changed.

Nearly all passenger airliners are converted into freight airlines. Through the nose servicing increases value of the aircraft for after market use by significantly lowering the cost of conversion. Reduced cost of conversion reduces the cost of ownership by raising the residual value of the aircraft.

Figure 14:
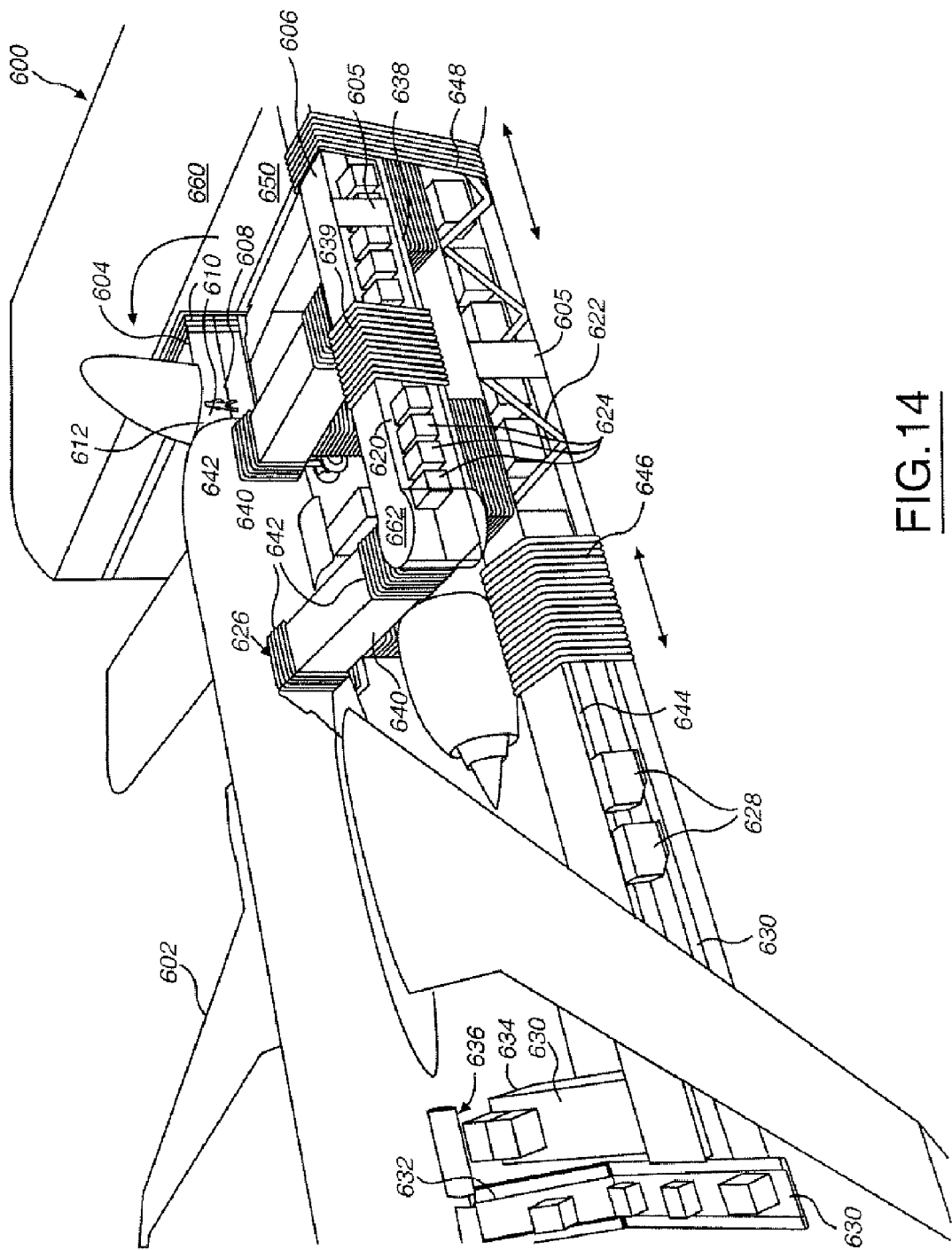
FIG. 14 is a perspective view of an integrated operational ground support system for an aircraft in accordance with another embodiment of the present invention.

Referring now to FIG. 14, a perspective view of an integrated operational ground support system 600 for an aircraft 602 in accordance with another embodiment of the present invention is shown. The ground support system 600 includes a passenger servicing bridge 604 and a multi-level cabin and cargo servicing bridge 606 that is separate and isolated from the passenger servicing bridge 604. The servicing bridges 604 and 606 may have any number of auxiliary access doors 605.

The passenger servicing bridge 604 includes a passenger main bridge section 608 and one or more flex extensions 610. Passengers ingress and egress from the aircraft 602 within the passenger main section 608 through the nose 612 of the aircraft 602.

The cabin and cargo servicing bridge 606 includes an upper level or terminal level 620 and a lower level or cargo level 622. Ingress and egress of service carts 624 and cabin cleaning crewmembers is performed on the terminal level 620 through the upper service openings 626 of the aircraft 602. Ingress and egress of cargo 628 is performed on the cargo level 622. The cargo 628 is loaded in and unloaded from the aircraft 602 via conveyors 630, including a ramp conveyor 632 and a linear drive cargo lift 634 through the lower service opening 636.

The terminal level 620 includes a cabin main bridge section 638 with a flex extension 639 and a pair of lateral bridge sections 640, each of which having flex extensions 642. The cargo level 622 includes a cargo main bridge section 644 also with a flex extension 646. Another flex extension 648 may also be utilized between a multi level rotunda 650 and the cabin and cargo servicing bridge 606. The terminal level 620 is coupled to the cargo level 622 via bridge lifts 652 for adjusting vertical position of the terminal level 620.

Various rotundas may exist between the terminal 660 and the bridges 604 and 606 and as part of the bridges 604 and 606, such as the rotunda 662, to allow the bridges 604 and 606 to rotate to and away from the aircraft 602. Motion of the flex extensions 642 and the rotundas 650 and 662 is illustrated in FIG. 16.

Figure 15:
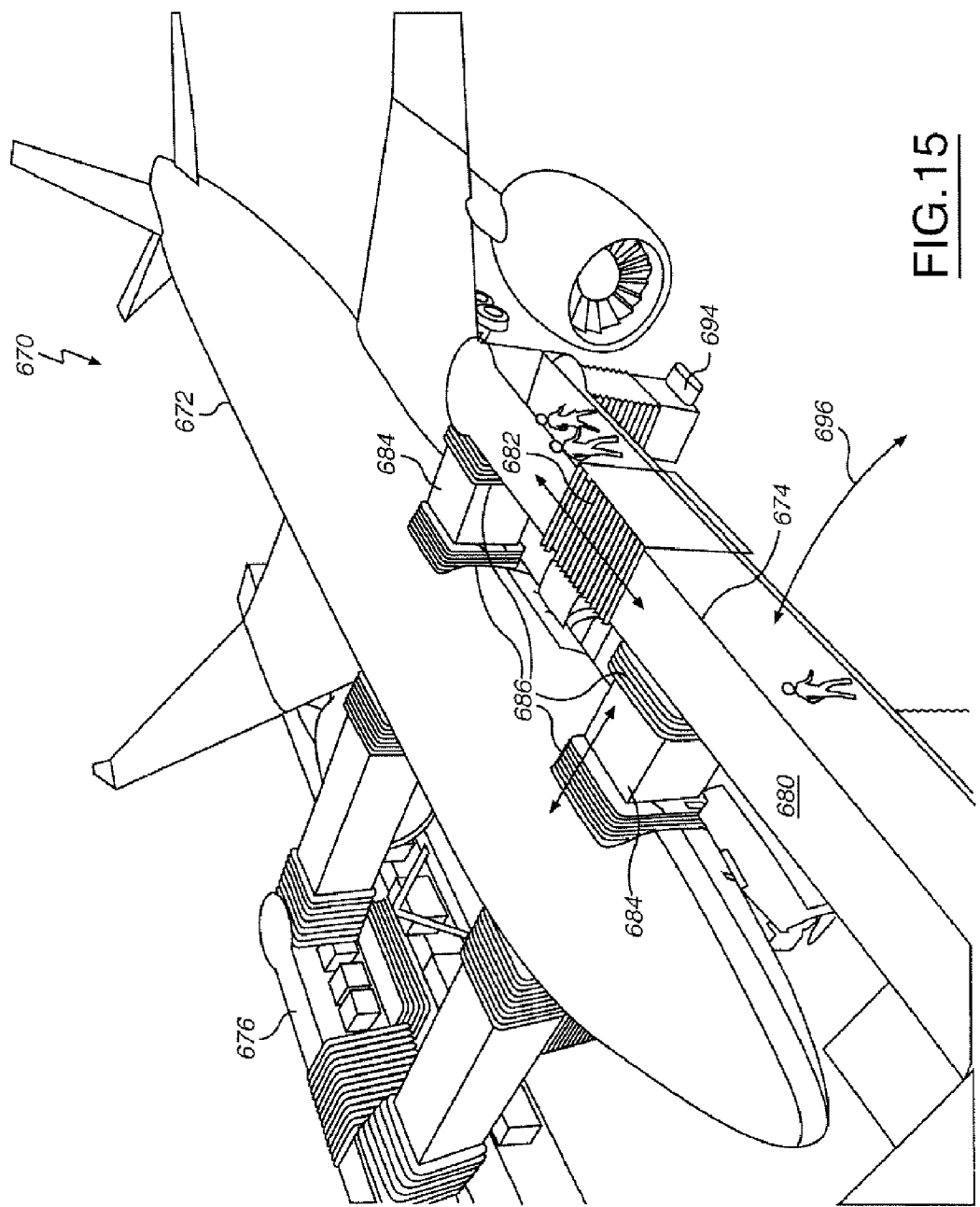
FIG. 15 is a perspective view of an integrated operational ground support system for an aircraft in accordance with yet another embodiment of the present invention.
Figure 16:
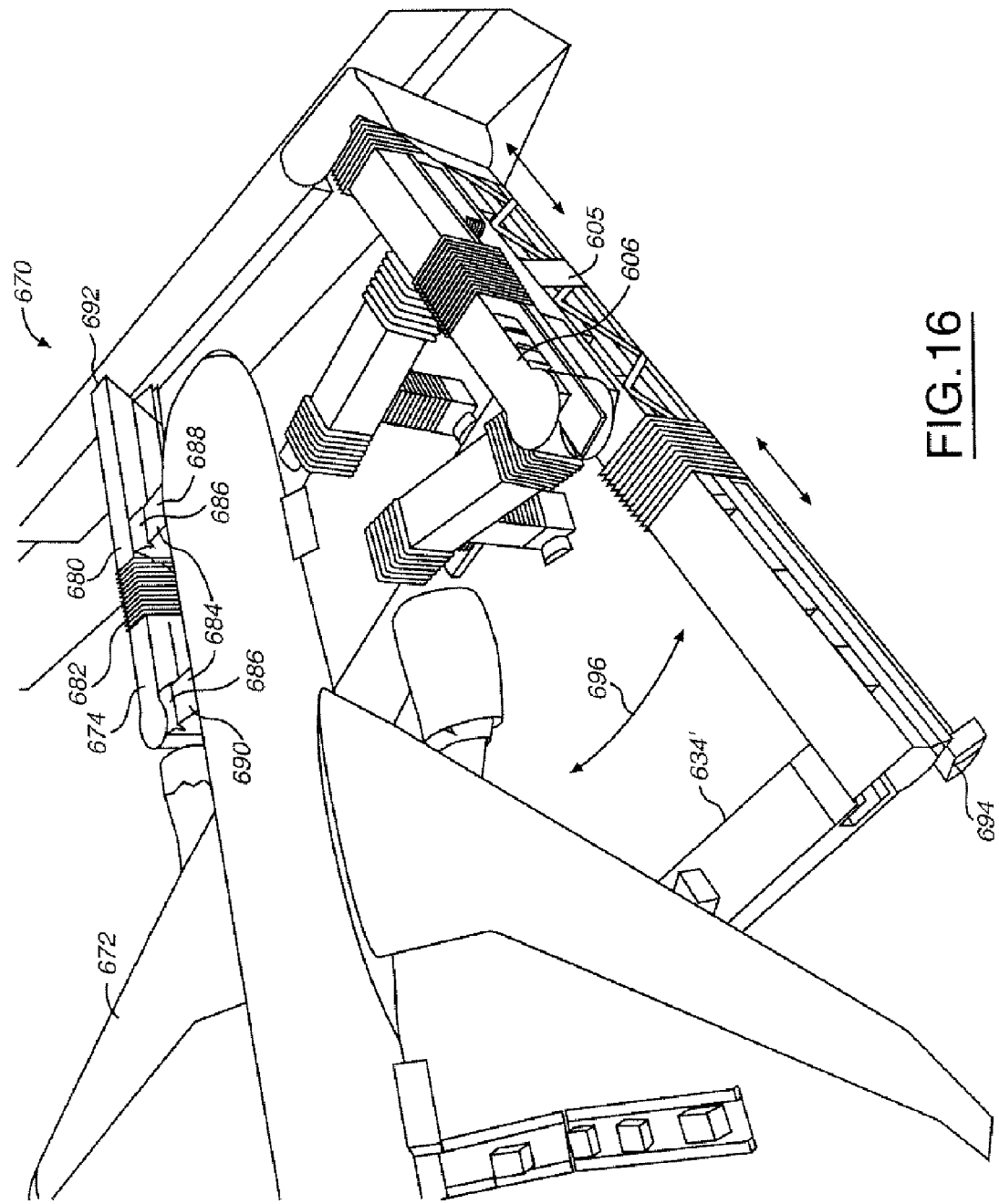
FIG. 16 is a perspective view of the ground support system of FIG. 15 illustrating servicing bridge pivot motion.

Referring now to FIGS. 15 and 16, a perspective view of an integrated operational ground support system 670 for an aircraft 672 and a perspective view illustrating servicing bridge pivot motion thereof are shown in accordance with yet another embodiment of the present invention. The ground support system 670 includes a passenger servicing bridge 674 and a cabin and cargo servicing bridge 606', which is similar to the cabin and cargo servicing bridge 606. The passenger servicing bridge 674 couples to the port side of the aircraft 672 to allow passenger ingress and egress therethrough.

The passenger servicing bridge 674 includes a passenger main bridge section 680 with a flex extension 682 and a pair of bridgeheads 684, each with a pair of flex extensions 686. Passengers may ingress and egress within and along the main section 680 into a port side of the aircraft 672 via the bridgeheads 684. The bridgeheads 684 include a first fore bridgehead 688 and a first aft bridgehead 690. Flex extensions 682 and 692 allow the bridgeheads 684 to be articulated in fore and aft directions along the aircraft 672 for proper alignment with aircraft doors.

The passenger servicing bridge 674 and the cabin and cargo servicing bridge 606' may be on wheels 694 and rotated to and away from the aircraft 672, as is depicted by arrows 696. The linear drive cargo lift 634' may be coupled to the cabin and cargo servicing bridge 606' and be rotated away from the aircraft 672 simultaneously with the cabin and cargo servicing bridge 606'.

With conventional aircraft, services may be supplied with service docking couplers that engage with the aircraft from the lower lobe regions on the port and starboard sides forward of the wings. Cargo loading and unloading may also be automated.

Figure 17:
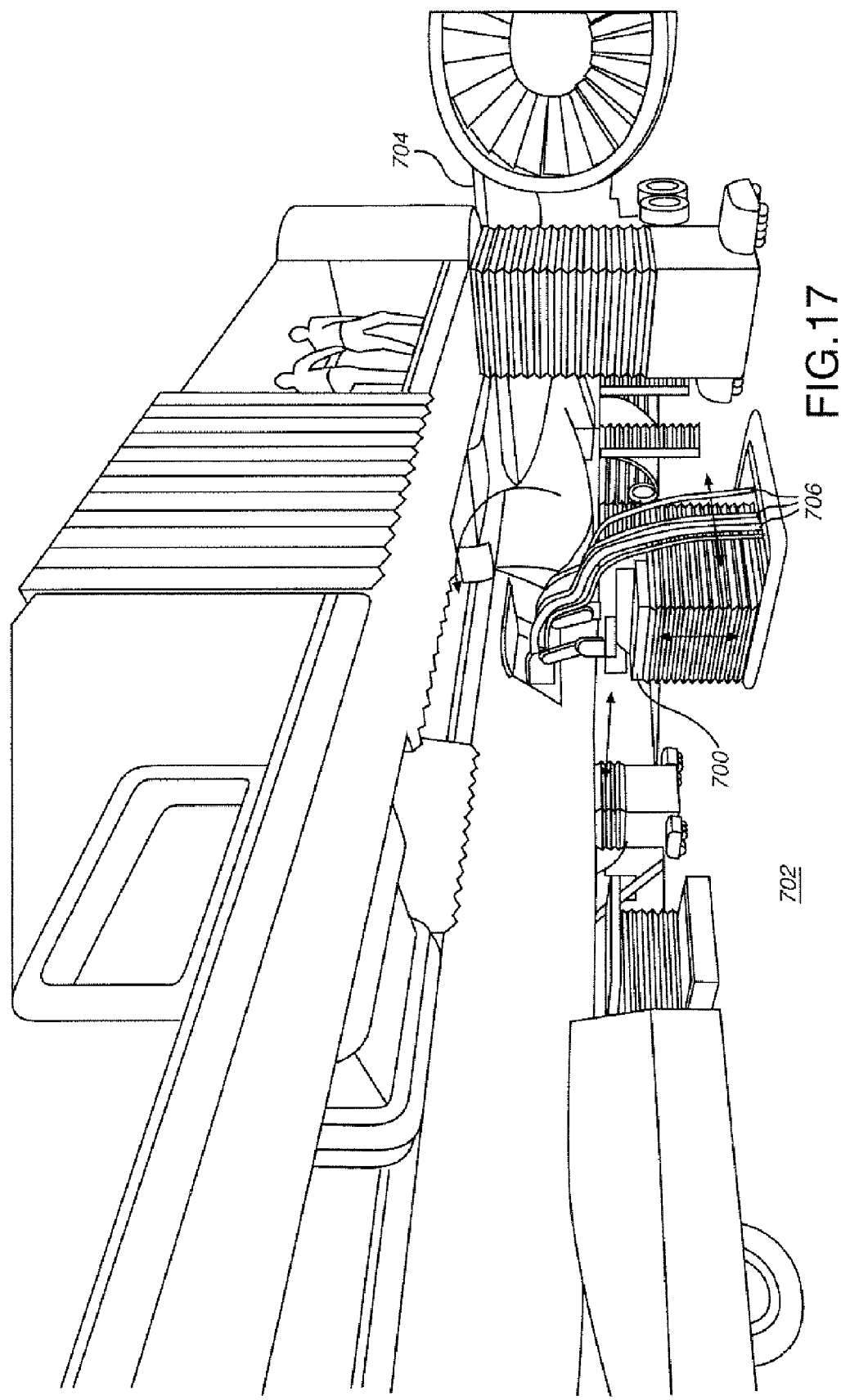
FIG. 17 is a perspective view of a tarmac interface service system in accordance with an embodiment of the present invention.

Referring now to FIG. 17, a perspective view of a tarmac interface service system 700 in accordance with an embodiment of the present invention is shown. The tarmac service system 700 extends out from the tarmac 702 and couples to the aircraft 704. The tarmac service system 700 may couple to the aircraft 704 in various locations. The tarmac service system 700 provides primary services to the aircraft 704. Conduit 706 is coupled to the aircraft 704, as shown, and fuel, air, electrical power, water, and coolant may be supplied to the aircraft 704. Fluids, such as potable water system and gray water may be removed from the aircraft 704 or be refurbished.

Figure 18:
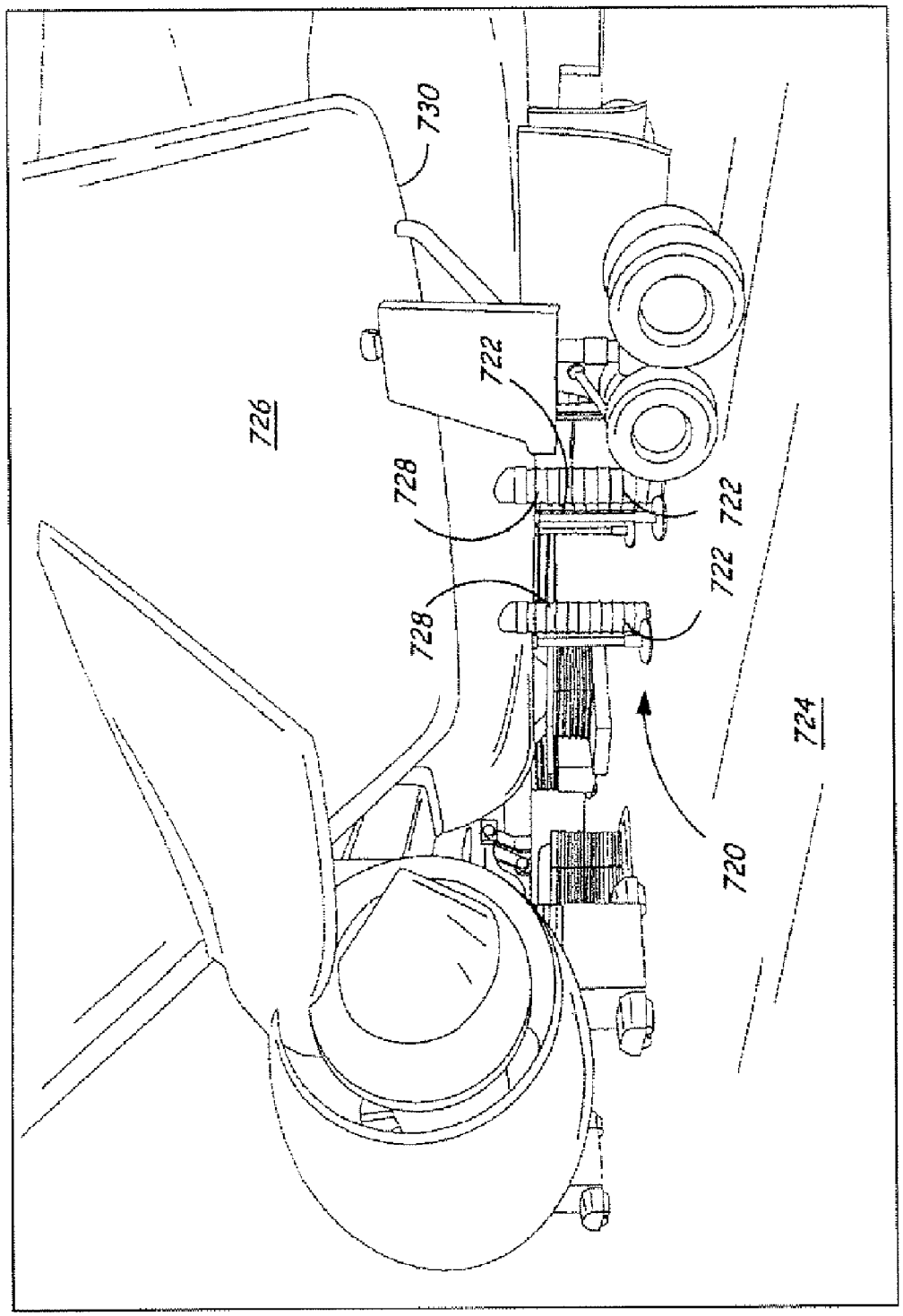
FIG. 18 is a perspective view of a fuel hydrant supply system in accordance with yet another embodiment of the present invention.

Referring now to FIG. 18, a perspective view of a fuel hydrant supply system 720 in accordance with yet another embodiment of the present invention is shown. The fuel hydrant supply system 720, as shown, is a four-point hydrant system, which includes two pair of hydrants 722 that extend from the tarmac 724 and couple to the aircraft 726. Each of the hydrants 722 may also have an inner supply tube (not shown, but similar to inner tube 233) and an outer jacket 728 for pulling fumes away from the aircraft 726. The hydrants 722 may be coupled on a side of the aircraft 726 inboard of a wing to body joint 730, as shown, or may be couple to other locations on the aircraft 726.

Figure 19:
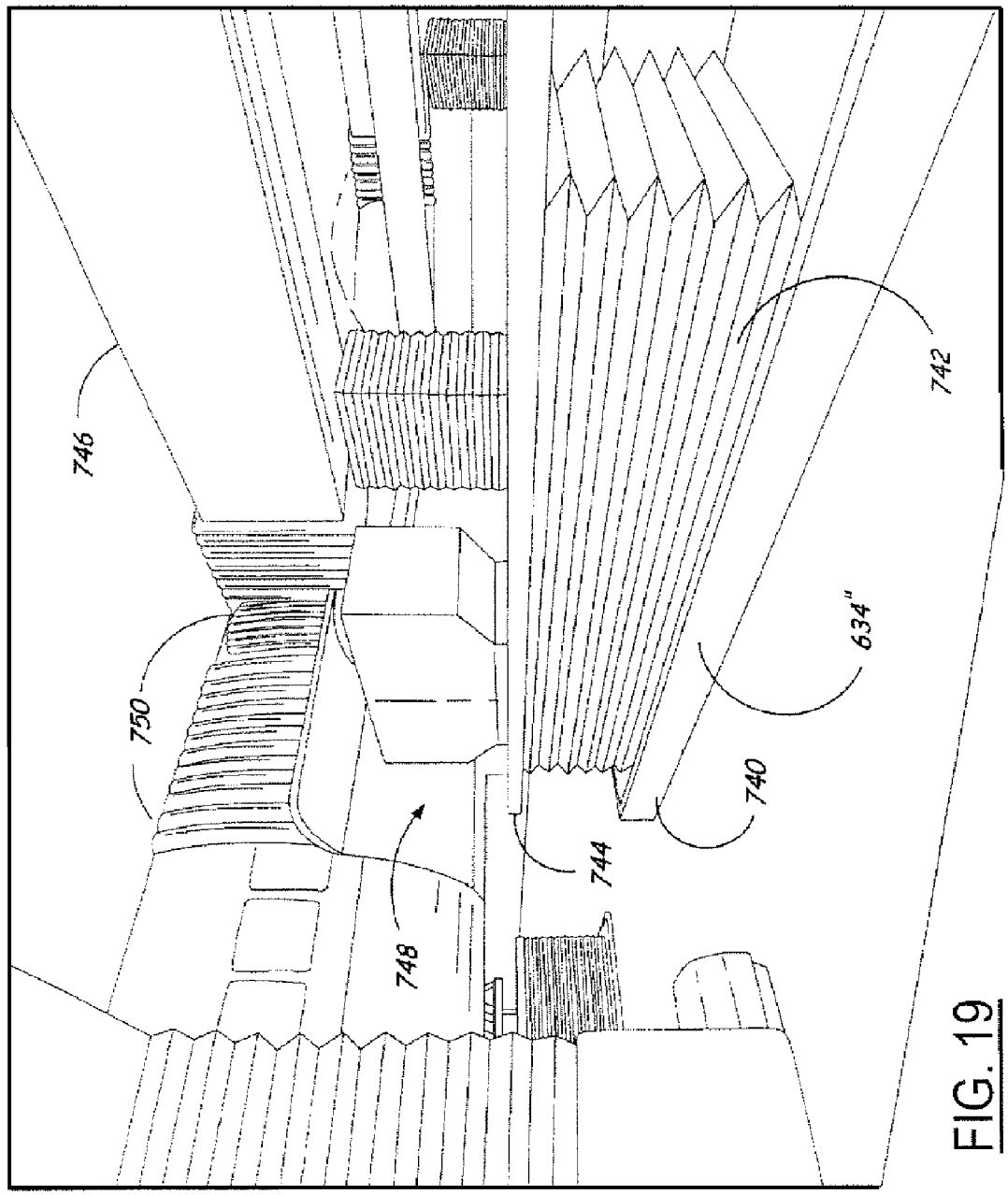
FIG. 19 is a perspective view of a linear drive cargo lift in accordance with yet another embodiment of the present invention.

Referring now to FIG. 19, a perspective view of a linear drive cargo lift 634" in accordance with yet another embodiment of the present invention is shown. The linear drive cargo lift 634" includes a base 740 with a flex extension 742 oriented to provide lift to a conveyor table 744. Objects are transported on the conveyor table 744 from the cabin and cargo servicing bridge 746 to the cargo hold 748 of the aircraft 750.

Figure 20:
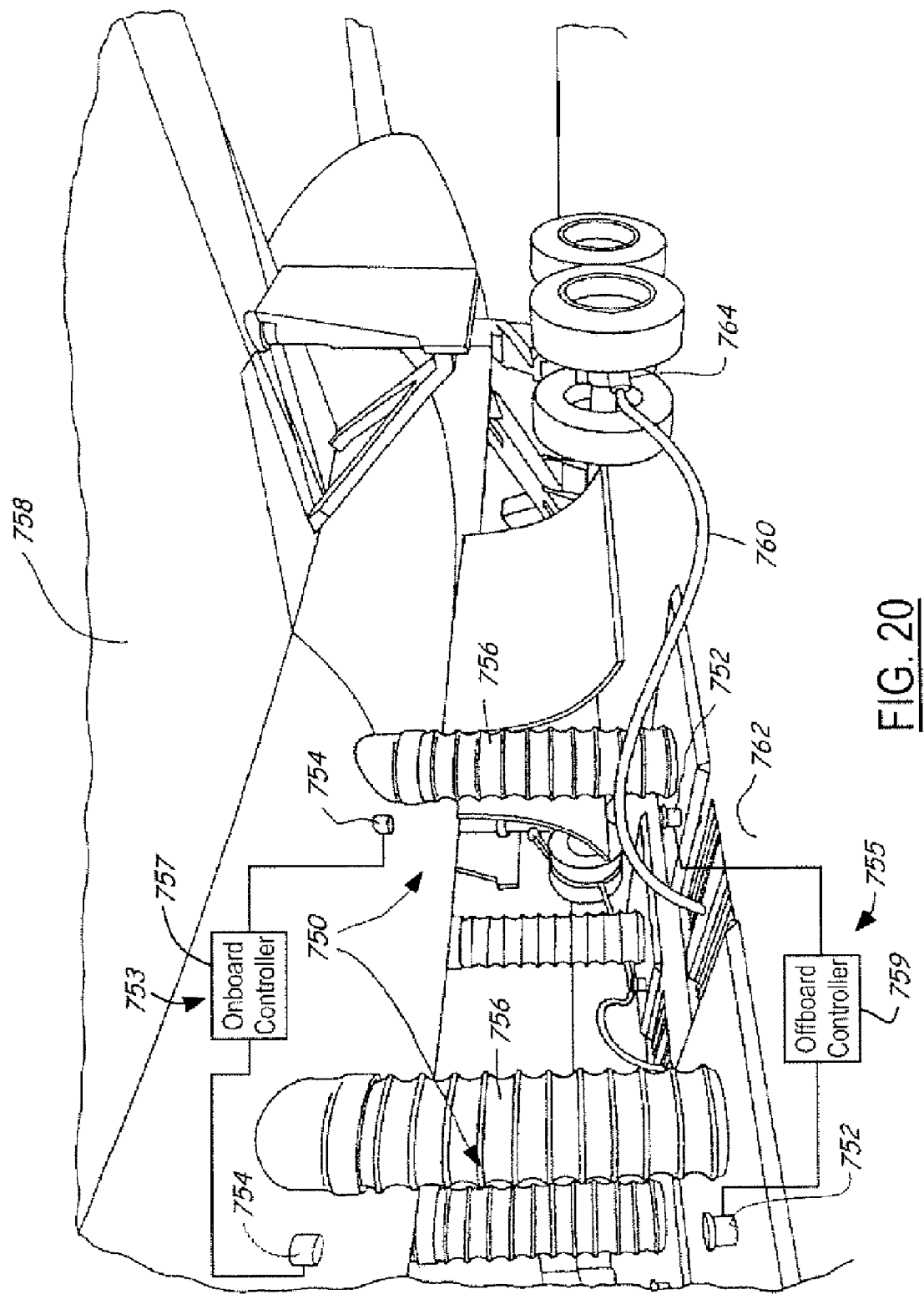
FIG. 20 is a perspective view of a machine vision alignment system in accordance with another embodiment of the present invention.

Referring now to FIG. 20, a perspective view of a machine vision alignment system 750 in accordance with another embodiment of the present invention is shown. The alignment system 750 is part of an aircraft/terminal mating system 751 and includes cameras 752 and alignment couplers 754. The aircraft/terminal mating system 751 includes an aircraft onboard portion or terminal mating system 753 and a terminal portion or aircraft mating system 755. A controller, such as the onboard controller 757 or the offboard controller 759, is coupled to the cameras 752, the couplers 754, and to the sensors, mentioned above with respect to the embodiment of FIG. 7. The controller(s) determine the mating status of the connectors in response to signals received from the cameras 752, the couplers 754, and the sensors. The controller(s) may be any onboard or offboard controller, such as a vehicle onboard servicing controller, a terminal gate controller or an airport controller.

The alignment system 750 may be controlled by vehicle on-board systems to align cameras 752 with the couplers 754. This alignment system 750 aids in aligning the fueling ports of the aircraft 758 with the flow back and vapor collection jackets 756. The sample embodiment of FIG. 20 also illustrates the supply of brake coolant via a coolant line 760 between the tarmac 762 and the brake system 764 of the aircraft 758.

Figure 21:
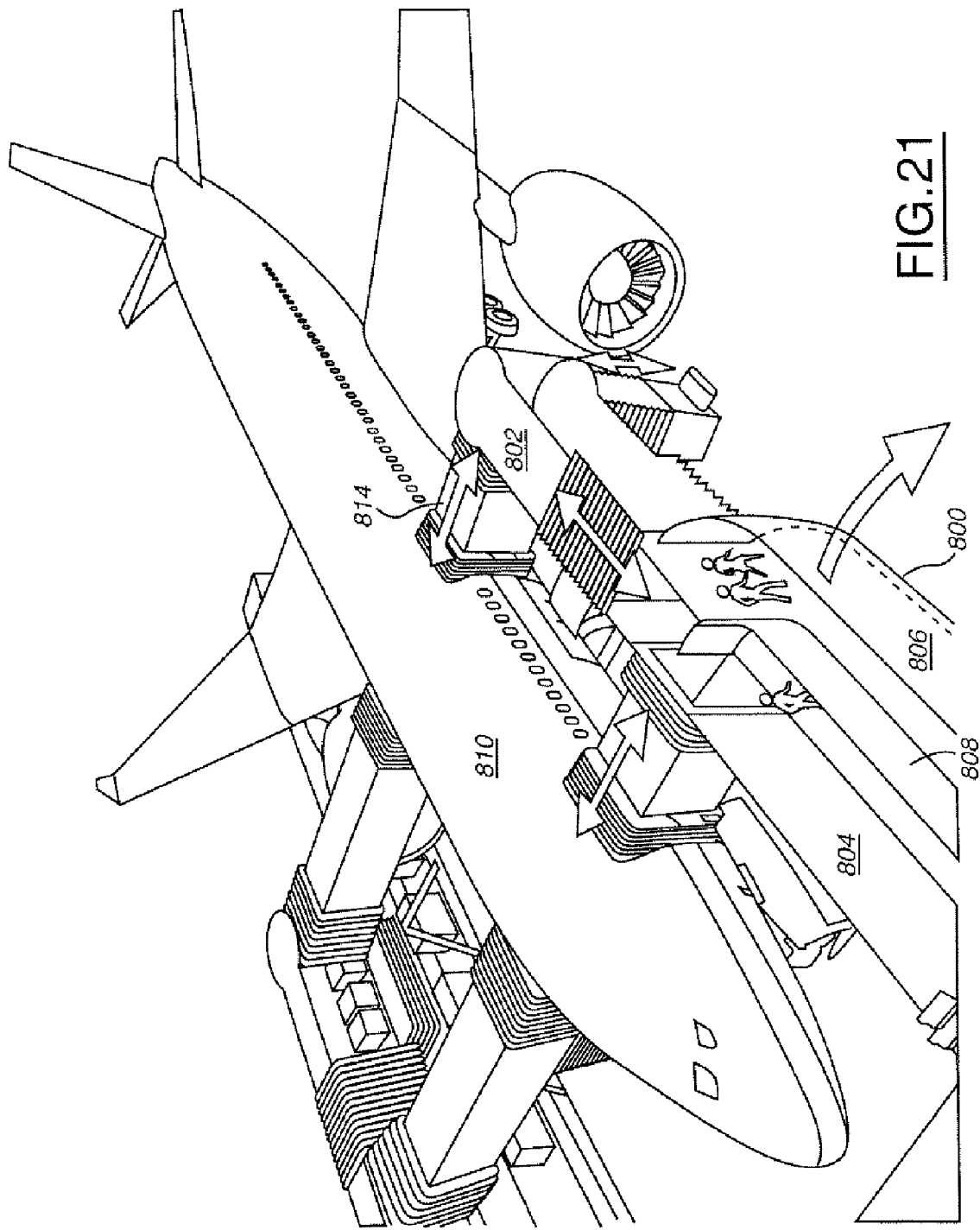
FIG. 21 is a perspective view of a passenger servicing bridge having a double door servicing bridge in accordance with another embodiment of the present invention.

Referring now to FIG. 21, a perspective view of a passenger servicing bridge 800 having a double door servicing bridge 802 in accordance with another embodiment of the present invention is shown. The double door servicing bridge 802 includes multiple servicing paths, which are represented by a first class corridor 804 and a second class or general class corridor 806. The first class corridor 804 is separated from the second class corridor 806 by a center wall 808. First class passengers ingress and egress the aircraft 810 via the first class corridor 804 and through a first bridgehead 812. Other passengers ingress and egress the aircraft 810 through the second corridor 806 and a second bridgehead 814. The corridors 804 and 806 although shown for ingress and egress of passengers, may be utilized for other aircraft services. Although the servicing paths, as shown, are utilized for ingress and egress of passengers, multiple servicing paths may be used for other services and on multiple levels.

Figure 22A:
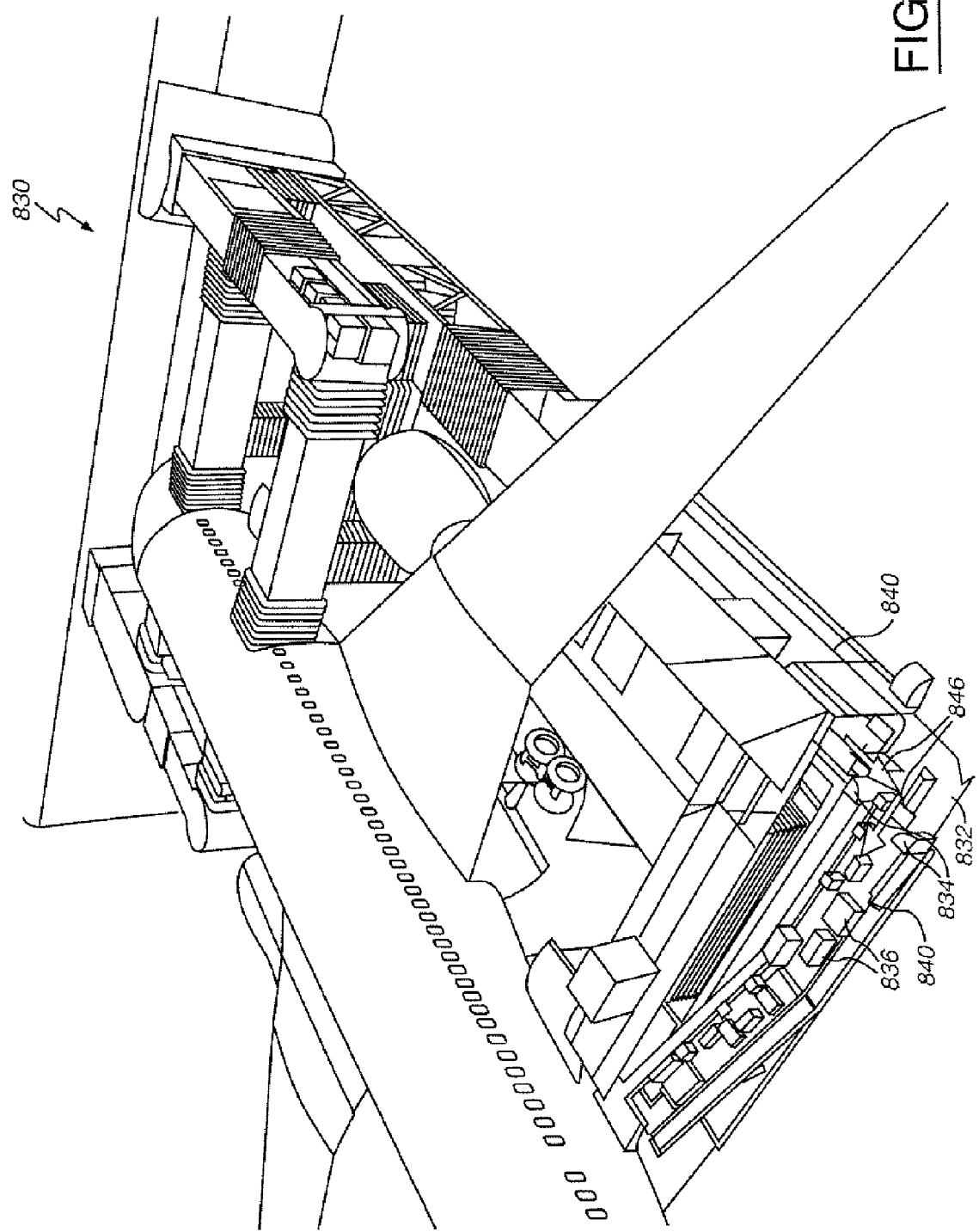
FIG. 22A is a perspective view of a ground support system incorporating a 90° adjustable feed direction platform in accordance with another embodiment of the present invention.
Figure 22B:
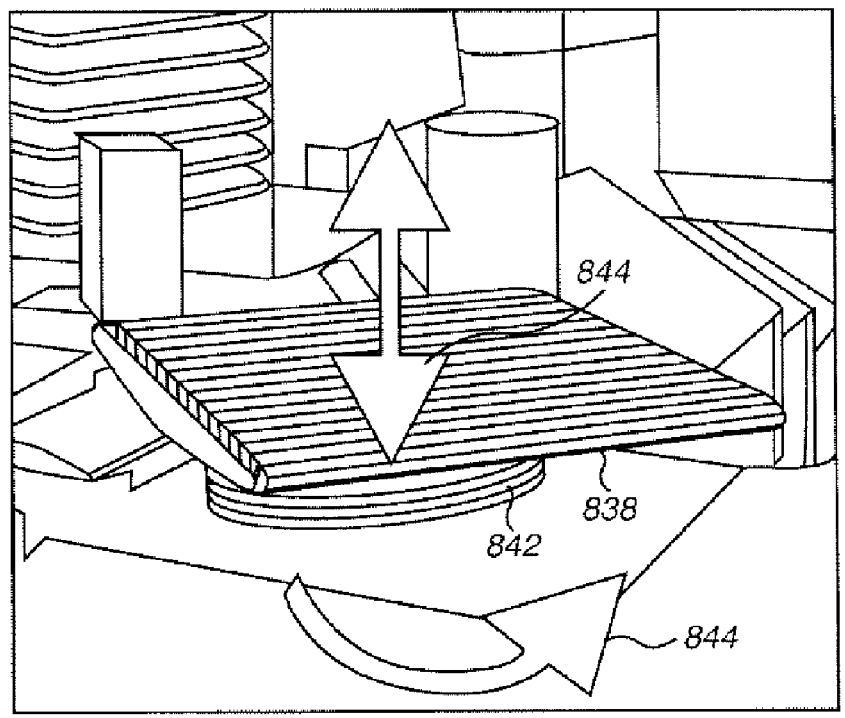
FIG. 22B is a perspective view of the feed platform of FIG. 22A switching convey direction.
Figure 22C:
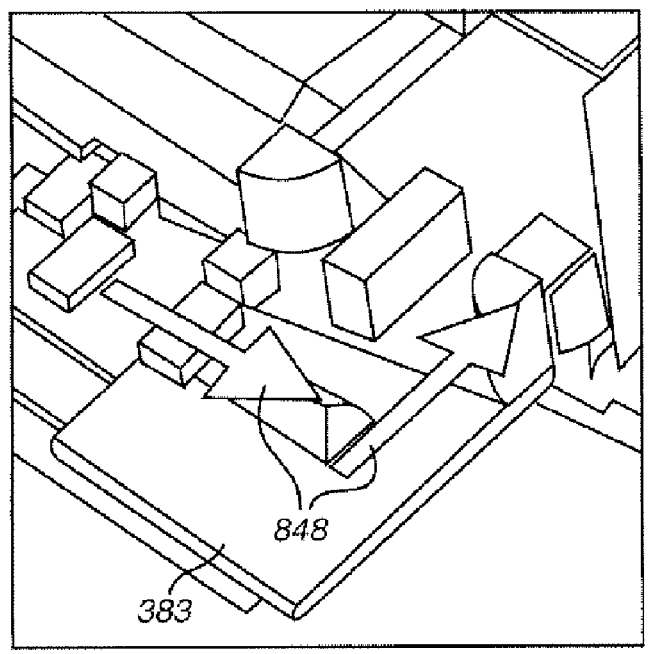
FIG. 22C is a perspective view of the feed platform of FIG. 22A in an off-loading mode.

Referring now to FIGS. 22A-C, a perspective view of a ground support system 830 incorporating a cargo carousel or more specifically a 90° adjustable feed direction platform 832 and perspective views of the feed platform 832 are shown in accordance with another embodiment of the present invention. The feed platform 832 includes cargo guides/bumpers 834 for the guidance of cargo 836 on and off the feed platform 832. The feed platform 832 includes a rotating belt 838, which coveys or transfers the cargo 836 between cargo loaders or handlers 840. The convey direction of the feed platform 832 may be adjusted by rotating the feed platform 832 on swivel 842. For example, to switch the convey direction, in the example embodiment shown, the feed platform 832 may be lifted and rotated 90°, as represented by arrows 844 in FIG. 22B. Loading is represented by arrows 846 in FIG. 22A and off-loading is represented by arrows 848 in FIG. 22C.

Figure 23:
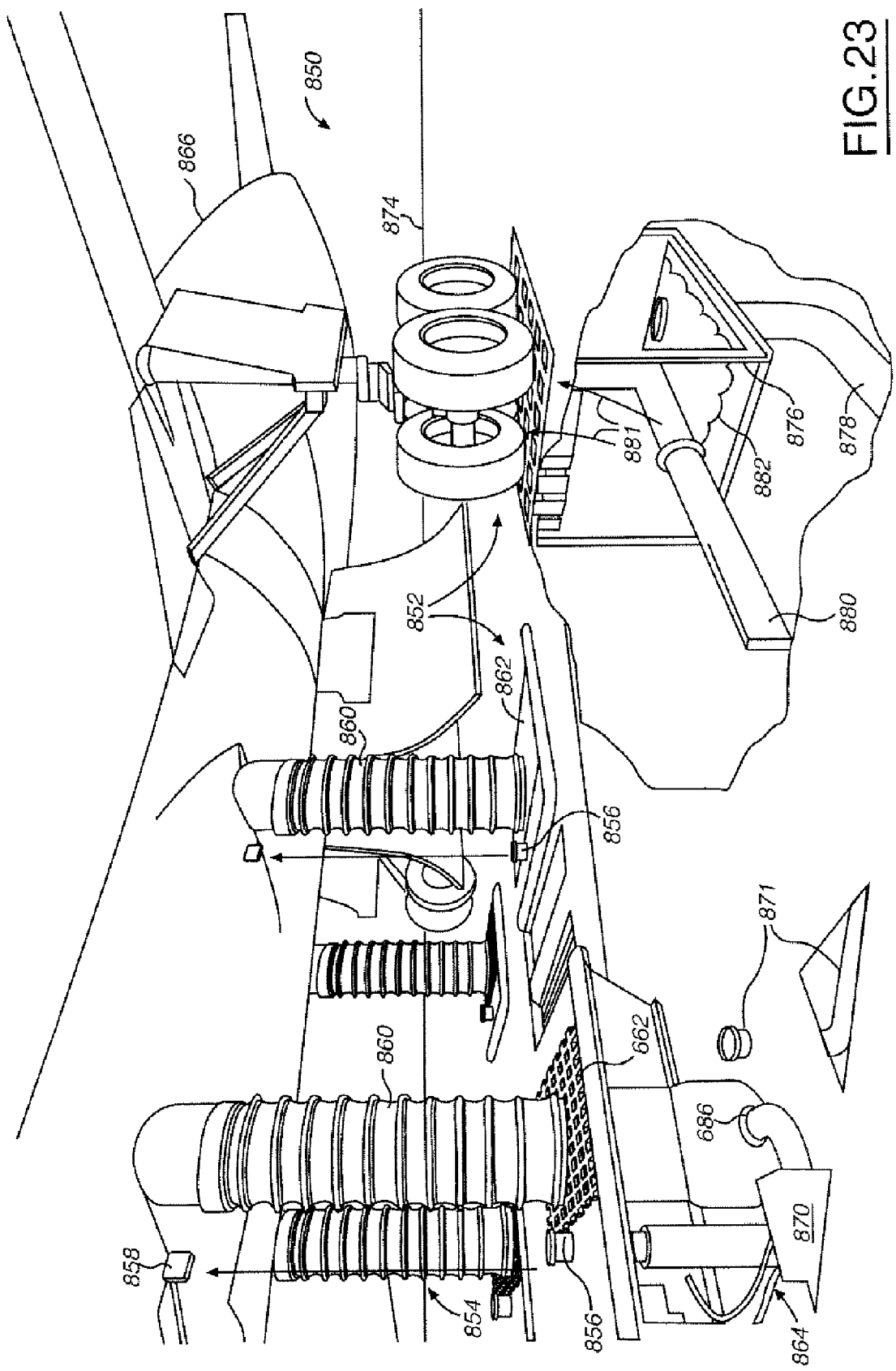
FIG. 23 is a perspective view of a fuel hydrant supply and brake cooling system incorporating a drainage system in accordance with another embodiment of the present invention.

Referring now to FIG. 23, a perspective view of a fuel hydrant supply and brake cooling system 850 incorporating a drainage system 852 in accordance with another embodiment of the present invention is shown. The fuel supply and brake system 850 includes a machine vision alignment system 854 similar to the alignment system 750 with cameras 856 and alignment couplers 858. The fuel supply and brake system 850 also includes fueling ports with flow back and vapor collection jackets 860 and spill traps 862. Any liquid or fuel spillage on the tarmac near the flow back and vapor collection jackets 860 drains through the spill traps 862 underground into an undertarmac level 864 and is isolated from the aircraft 866. A fuel line 868 is coupled to the flow back and vapor collection jackets 860 and to a fuel control valve 870, which is used to adjust the flow of fuel to the aircraft 866. A fluid drain pipe 871 resides in the undertarmac level 864 and allows for drainage of fluids residing therein.

In addition, tarmac brake coolant vents 872 are provided to allow for cooling air to be emitted from the tarmac 874 and directed at the brakes (not shown) of the aircraft 866. The vents 872 serve as an air vent and as a spill trap. Ambient air may flow through the vents 872. Any fluids leaking from the aircraft 866 near the brakes drains through the vent 872, is collected into a holding reservoir 876, and eventually out a drainage pipe 878. An air supply pipe 880 is coupled to the holding reservoir 876 above a fluid level 882 such that the air does not flow through any fluid contained therein. Air directed at the brakes is represented by arrows 881.

Figure 24:
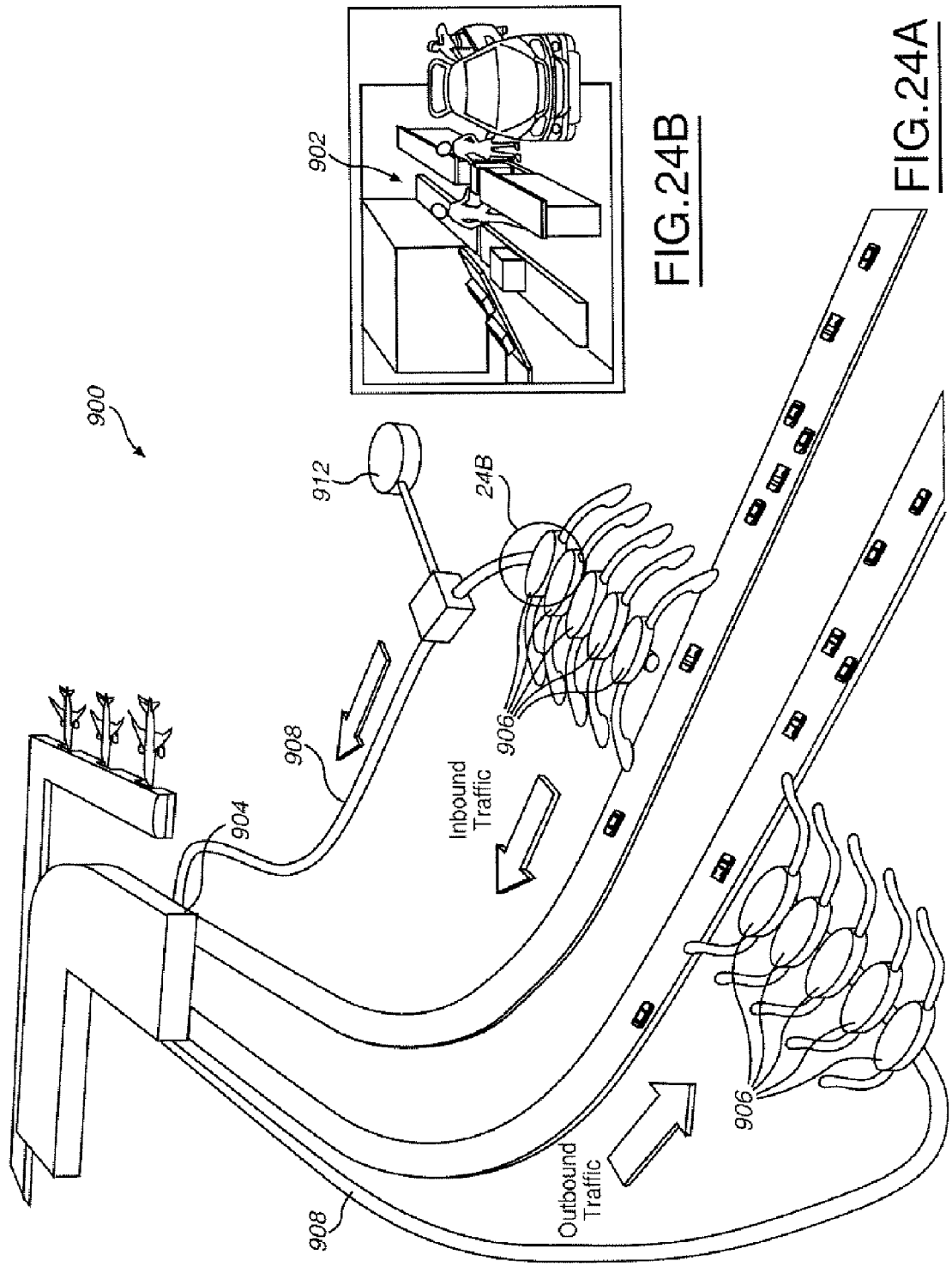
FIG. 24A is an overhead perspective view of a remote baggage handling system in accordance with another embodiment of the present invention.
FIG. 24B is a perspective view of a baggage drop-off terminal in accordance with another embodiment of the present invention.

Referring now to FIGS. 24A-B, an overhead perspective view of a remote baggage handling system 900 and a perspective view of a baggage "drop-off" terminal 902 are shown in accordance with another embodiment of the present invention. The remote baggage handling system 900 includes the remote baggage drop-off terminals 902 wherein passengers "check-in" their baggage and cargo before traveling and arriving at the airport terminal 904. Remote baggage "pick-up" terminals 906 are similarly located at a remote location from the airport terminal 904, as that of the drop-off terminals 902, wherein passengers may pick-up their baggage upon leaving the airport terminal 904. The drop-off terminals 902 and the pick-up terminals 906 may have associated or designated airlines, such as Delta™, Alaska™, Southwest™, Northwest™, American™, and Continental™. A baggage transfer system 908 conveys the baggages and cargo between the airport terminal 904 and the baggage terminals 902 and 906. The baggage drop-off terminal 902 and the baggage pick-up terminal 906 are remotely located such that baggages may be inspected and scanned prior to entering the airport terminal 904. This increases airport safety.

An x-ray and weapon/explosive detection equipment center 910 may be located at the baggage drop-off terminal 902 or at some other location between the baggage drop-off terminal 902 and the airport terminal 904 or in route along the baggage transfer system 908, as shown. The weapon/explosive center may scan baggage for any unpermitted objects known in the art including weapons, explosives, gas tanks, stolen objects, drugs, alcohol, and large quantities of money. When an explosive is detected in a baggage within the weapon/explosive center 910, the baggage may be transported directly to a remote detonation bunker 912 wherein it may be safely detonated and not cause harm to any passengers, animals, airport personal, or airport systems and equipment.

In operation, inboard passengers drops-off their baggages at the baggage drop-off terminal 902. The baggages are scanned and inspected and then transferred, when deemed safe, to the airport terminal 904. The passengers upon dropping off their bags travel in their vehicles or via shuttle to the airport terminal 904. This is performed in reverse for outboard passenger traffic. The remote baggage handling system 900 relieves airport congestion, increases available airport terminal space, and when applied to a traditional airport terminal is a non-intrusive modification.

Figure 25:
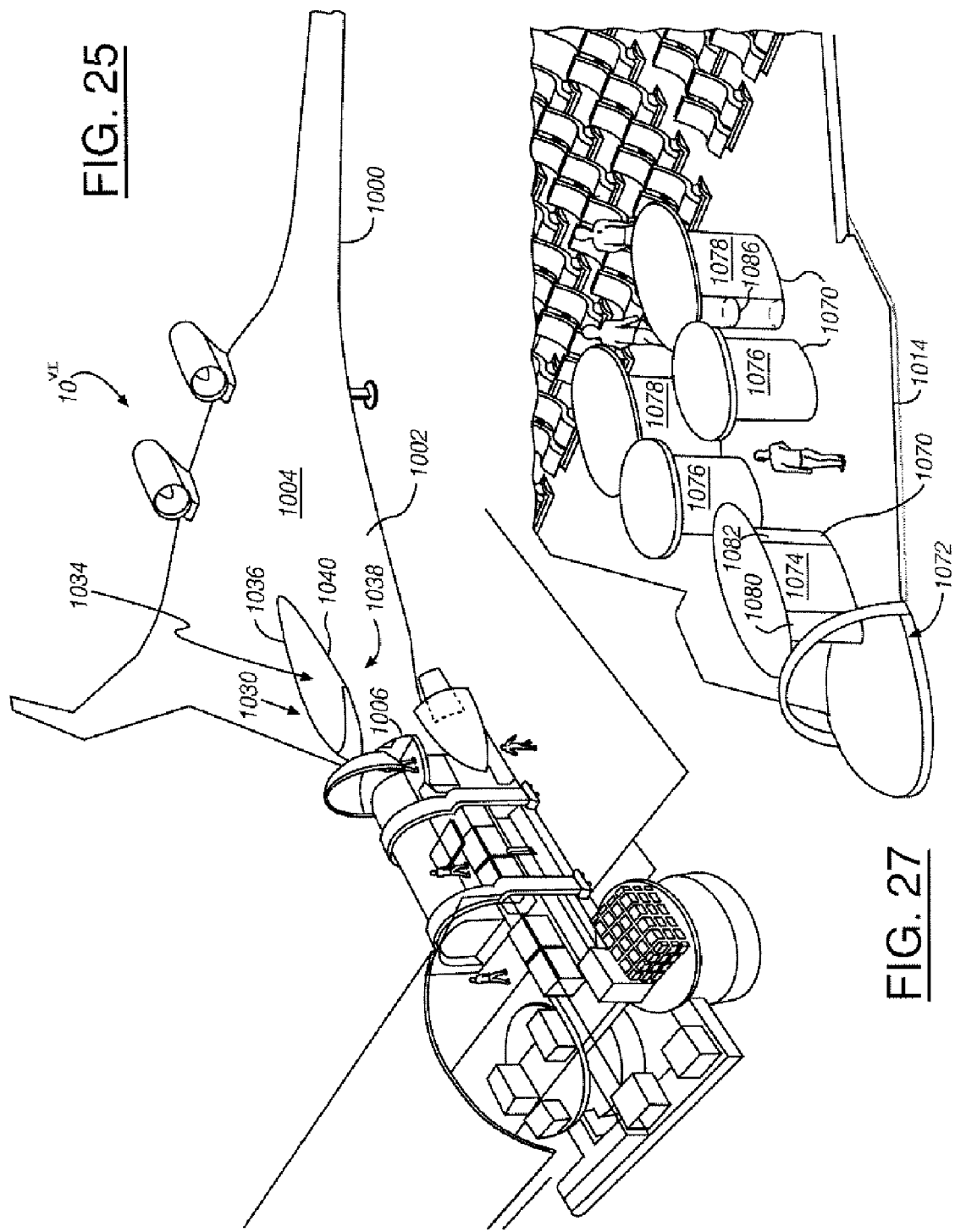
FIG. 25 is a top perspective view of an integrated operational ground support system incorporated a blended wing aircraft design in accordance with another embodiment of the present invention.
Figure 26:
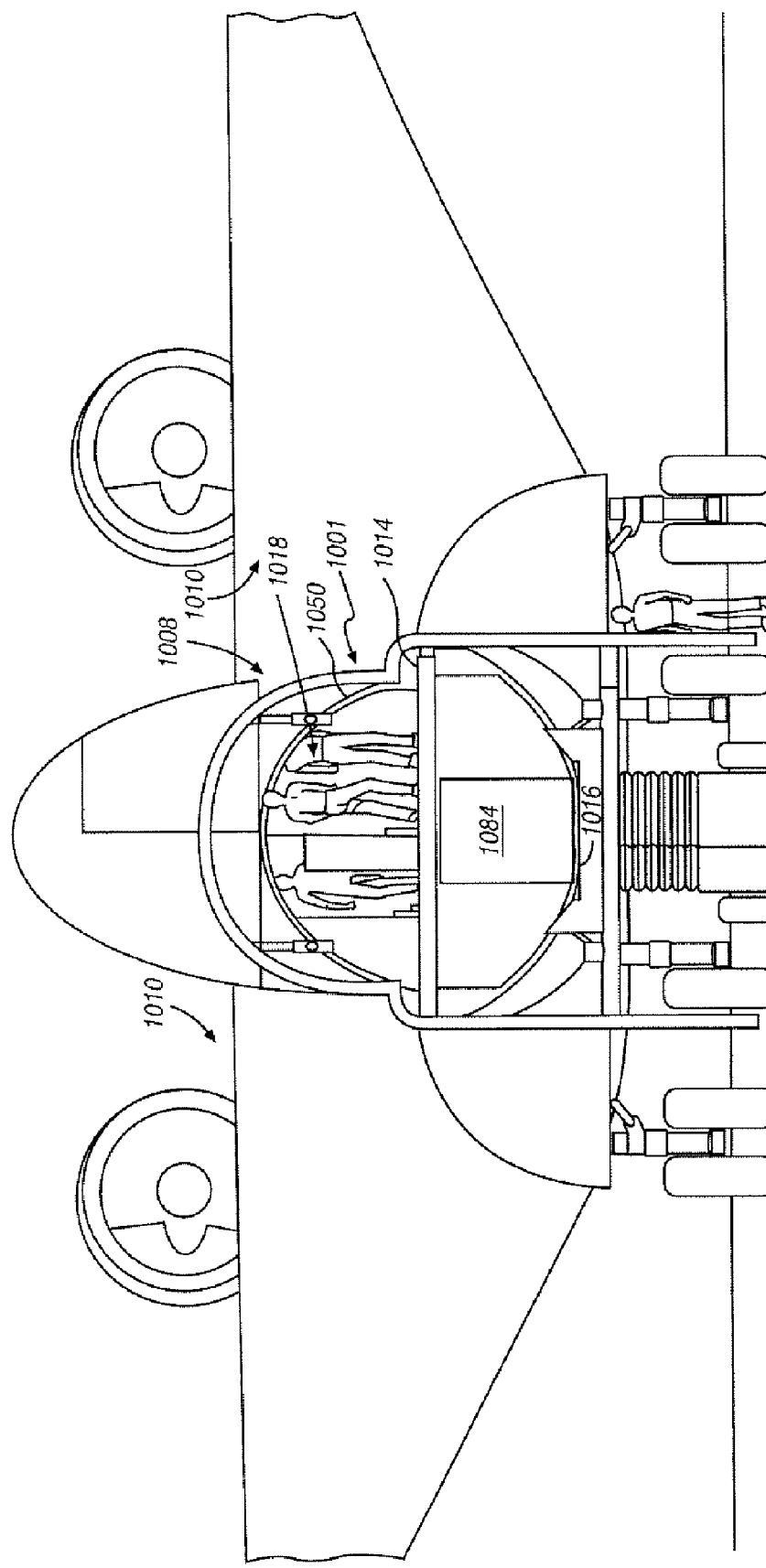
FIG. 26 is a front open-end view of an aircraft security system in accordance with an embodiment of the present invention.

Referring now to FIGS. 25 and 26, a top perspective view of an integrated operational ground support system $10^{VI}$ incorporated a blended wing aircraft design and a front open-end view of an aircraft security system 1001 are shown in accordance with another embodiment of the present invention. The ground support system $10^{VI}$ is similar to the above-described ground support systems, however it is modified for a blended wing body aircraft 1000.

The aircraft 1000 has a single unitary body structure 1002 that is substantially different than that of a traditional aircraft. Instead of having a traditional fuselage and a pair of wings that are attached thereto, the aircraft 1000 has a blended wing body 1004. The blended wing body 1004 is in the form of a single airfoil and provides a substantially open interior design in which there is open access to a significant portion of the interior 1006 of the blended wing body 1004.

The blended wing body 1004 has a central portion 1008 with left and right airfoil sections 1010. A nose opening 1012 provides access to a passenger level 1014 and to a cargo level 1016. Upon entering the passenger level 1014, one experiences a wide-open view of a passenger interior compartment 1018 that extends into the airfoil sections 1010, as is best seen in FIGS. 27 and 28.

Figure 28:
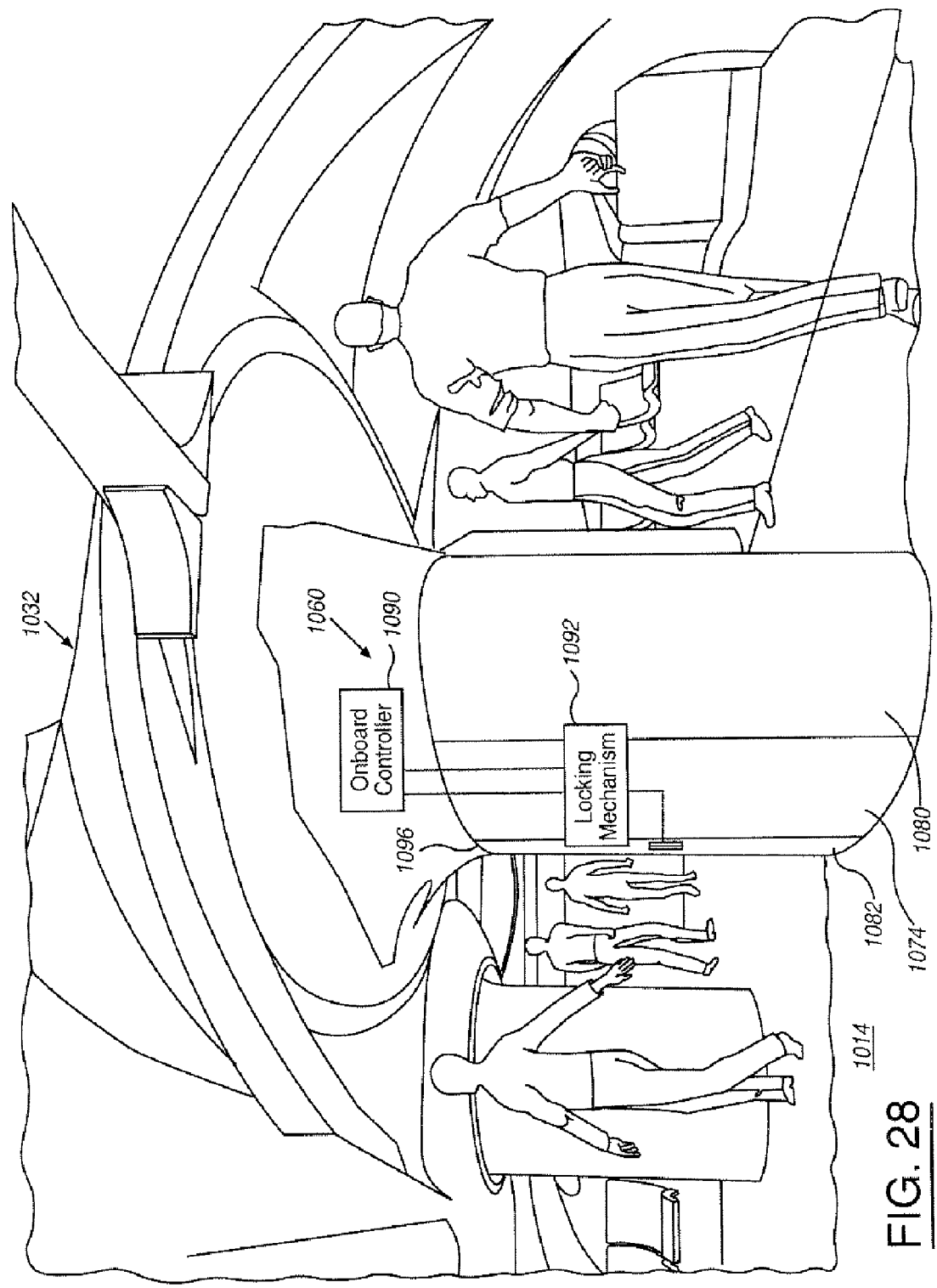
FIG. 28 is an internal perspective view of a passenger level incorporating an elevator shaft in accordance with an embodiment of the present invention.

The aircraft security system 1001 includes a passive system 1030 and multiple active systems 1032 (only one of which is shown in FIG. 28). The passive system 1030 and the active system 1032 prevent entrance onto the aircraft of suspicious cargo and access to a flight deck area by suspicious persons and devices.

The passive system 1030 includes an aircraft that is configured with an elevated and segregated or isolated flight deck area 1034. Although in FIG. 25 a blended wing aircraft is shown, this configuration may be implemented on various other style aircraft, such as aircraft 12 shown with respect to FIG. 5 above. The isolated flight deck area 1034 may be provided through the molding or integral blending of a hump 1036 in an upper fore part 1038 of an aircraft, as shown, or elsewhere on the aircraft. The flight deck area 1034, in the stated embodiment, has an associated flight deck level 1040 that is separate and different from other levels of the aircraft 1000. The flight deck area 1034 is separated and isolated from the passenger level 1014 and the cargo level 1016.

Another aspect of the passive system 1030 is the inclusion of a single service opening 1050 that is utilized for both passengers and cargo. The use of such an opening minimizes the amount of openings of an aircraft that need to be monitored. The service opening 1050 shown is a nose opening that provides access to the passenger level 1014 and the cargo level 1016.

The active systems 1032 may include the cargo monitoring or screening system 320 described above or the like, which may be incorporated into the aircraft 1000 and a flight deck access security system 1060, which is described in detail below with respect to FIG. 28. The flight deck access security system 1060 allows for the performance of a pre-flight check of crew prior to entrance into an isolated flight deck.

Referring now also to FIG. 27, a perspective level plan view of the passenger level 1014 incorporating multiple servicing columns 1070 in accordance with an embodiment of the present invention is shown. The servicing columns 1070 are incorporated into a forward area 1072 of the passenger level 1014. The servicing columns 1070 include a front stowage and elevator shaft column 1074, lavatory columns 1076, and galley columns 1078. The stowage and elevator shaft column 1074 provides stowage, for example, for first class supplies or for other servicing supplies and equipment. The stowage and elevator shaft column 1074 includes two elevators. The first elevator 1080 provides access to the cargo hold from the passenger level 1014. The second elevator 1082 provides access to the flight deck area 1034. The first elevator 1080 may be used to transport food and beverages to and from a storage unit 1084 on the cargo level 1016. The storage unit 1084 is shown in FIG. 26. The storage unit 1084 may be similar shaped as that of a cargo container and may also be conveyed on and off the aircraft 1000 like a cargo container. This provides more space on the passenger level 1014 by storing food and beverages elsewhere. The stowage and elevator shaft column 1074 and galley columns 1078 may have rotating carousels 1086 for food and beverages.

Referring now also to FIG. 28, an internal perspective view of the passenger level 1014 incorporating the stowage and elevator shaft column or elevator shaft 1074 in accordance with an embodiment of the present invention is shown. The elevator shaft 1074 has the flight deck elevator 1080, access to which is controlled by the flight deck access system 1060. The flight deck access system 1060 includes an onboard controller 1090, an internal locking mechanism 1092, and one or more access devices 1094 (only one is shown). The controller 1090 is coupled to the internal locking mechanism 1092 and to the access devices 1094 and provides access to the flight deck elevator 1080. The onboard controller 1090 may be similar to the onboard controllers described-above. A crewmember obtains access to the flight deck area 1034 by performing the appropriate access procedure on the access devices 1094, which opens the elevator door 1096 to provide access to the flight deck elevator 1080.

Note that although an flight deck elevator 1082 is shown for access to the flight deck area 1034, other techniques may be utilized and access thereto may be controlled by the flight deck access system 1060 or the like. For example, the elevator door 1096 may be in the form of a stairway door and operate similar to the elevator door 1096. Upon opening the stairway door a crewmember may ascend a flight of stairs or steps to get to the flight deck area 1034. The second elevator 1082 may also be replaced with a stairway or step-based system for descent to the cargo level 1016.

Also, note that the flight deck elevator 1080 is within a narrow and confined area, which limits the momentum an intruder may develop in attempting to enter the flight deck area 1034. Also, there is a limit to the size and amount of items that may be carried into the flight deck area 1034.

The locking mechanism 1092 may be of various types and styles. The locking mechanism 1092 may be electronically, hydraulically, pneumatically, or pneudraulically actuated or a combination thereof. The locking mechanism 1092 prevents unwarranted access of intruders into the flight deck elevator 1094.

The access devices 1094 may include one or more badge scanners, keyed locks, coded entering devices, body member scanning devices, such as a fingerprint scanner and a retinal scanner, a voice check device, or other access device known in the art. A single badge scanner is shown. To obtain access to the flight deck area 1034 a crewmember may swipe a badge, enter a code, supply a key, have his/her body member scanned or perform some other task to release and open the elevator door 1096. The flight deck access system 1060 may require multiple actions to be performed for access to the flight deck elevator 1080. For example, the flight deck access system 1060 may require that multiple badges be provided. In other words, the flight deck elevator 1080 may not be accessible unless two or more crewmembers or flight deck members are present with their access badges for scanning. Various access techniques can be envisioned by one skilled in the art.

The present invention provides integrated ground support systems that provide shortened gate turn around times and are convenient and efficient for both the airlines and flying public. The nose servicing aspects of the present invention allow for increased space capacity within an aircraft for an increased number of seats and cargo space. The nose servicing aspects also eliminate the need for side passenger ingress and egress doors and side cargo ingress and egress doors. Side passenger doors may be replaced with escape hatches. The reduced number of side doors also minimizes aircraft corrosion from water intrusion in doorways. The nose servicing aspects also minimize aircraft cargo handling systems.

The architecture of the integrated system provides shortened gate turn around cycles, reduced ground support personnel, reduced ground support equipment, and reduced risk of damage to an aircraft through ground support activities.

Through use of the present invention, the ground support working environment is significantly improved. Ground support personnel are able to service an aircraft within an enclosed environmentally controlled working environment with minimal fumes. Safety is improved and traditional sources of long-term physical aircraft damage are minimized. The ground support personnel are segregated from tarmac noise and environmental elements.

The present invention also improves airport runway capacity and airport throughput. The present invention also minimizes ground support equipment needed for servicing of an aircraft.

In addition, the present invention may be utilized to support traditional side ingress and egress aircraft. The present invention allows for the transfer of luggage, cargo, pallets, and containers from a terminal or staging area to directly to an aircraft using linear drives. The luggage, cargo, pallets, and containers may be radio frequency tagged to include information, such as ownership, weight, center of gravity, and other related information, which aids in loading and unloading thereof.

The above-described apparatus and method, to one skilled in the art, is capable of being adapted for various applications and systems including: aeronautical systems, land-based vehicle systems, or other applications or systems known in the art that require servicing of a vehicle. The above-described invention can also be varied without deviating from the true scope of the invention.

What is claimed is:

1. An aircraft comprising:
   a servicing opening;
   a plurality of service levels comprising a passenger level and a primary servicing level, wherein at least one of said service levels is a noncargo-based service level; and
   a health and maintenance monitoring system, wherein primary services provided on said primary service level through said service opening are adjusted in response to signals generated from said health and maintenance monitoring system; said plurality of service levels accessible through said service opening.

2. An aircraft as in claim 1 wherein said service opening comprising a nose opening.

3. An aircraft as in claim 1 wherein said servicing opening is configured for reception of at least one passenger transport module therethrough.

4. An aircraft as in claim 1 comprising a passenger transport module opening.

5. An aircraft as in claim 1 further comprising a flight deck area that is isolated from said service opening.

6. An aircraft as in claim 1 further comprising a security system monitoring services provided through said service opening.

7. An aircraft as in claim 1 further comprising a carry-on system for receiving a carry-on transport module through said service opening.

8. An aircraft as in claim 1 further comprising an onboard service system that is configured to couple to and receive at least one resource from an offboard service system on said primary servicing level through said service opening.

9. An aircraft as in claim 8 wherein said onboard service system receives a primary service selected from at least one of a fuel system, a power system, an electrical power system, a water system, an air system, and a brake cooling system.

10. An aircraft as in claim 8 wherein said onboard service system comprises at least one primary servicing coupler for attachment to a terminal primary service coupler.

11. An aircraft as in claim 1 configured to receive secondary services through said servicing opening.

12. An aircraft as in claim 11 wherein said secondary services are selected from at least one of cabin cleaning services, galley services, lavatories, and trash services to said at least one aircraft.

13. An aircraft as in claim 1 wherein said plurality of service levels comprise at least one secondary service level.

14. An aircraft as in claim 13 wherein said at least one secondary service level is configured to receive secondary services selected from at least one of cabin cleaning services, galley services, lavatory services, and trash services.

15. An aircraft as in claim 1 further comprising a terminal mating system, wherein services through said service opening are controlled in response to signals received from said terminal mating system.

16. An aircraft as in claim 15 wherein said terminal mating system comprises at least one machine vision specific device.

17. An aircraft as in claim 15 wherein said terminal mating system comprises a precision guidance specific device that follows a guideline to mate said service opening to a terminal docking port.

* * * * *